US005582357A

United States Patent [19]

Kosaka et al.

[11] Patent Number: 5,582,357

[45] Date of Patent: Dec. 10, 1996

[54] COIL WINDING APPARATUS

[75] Inventors: Takao Kosaka, Saitama; Akira Ono, Tokyo; Shinji Iwahashi, Kanagawa, all of Japan

[73] Assignee: Sony Corporation, Japan

[21] Appl. No.: 333,333

[22] Filed: Nov. 2, 1994

[30] Foreign Application Priority Data

| | | | |
|---|---|---|---|
| Nov. 8, 1993 | [JP] | Japan | 5-300827 |
| Nov. 8, 1993 | [JP] | Japan | 5-300828 |
| Mar. 7, 1994 | [JP] | Japan | 6-059803 |
| Mar. 7, 1994 | [JP] | Japan | 6-059804 |

[51] Int. Cl.[6] .......... H01G 13/02

[52] U.S. Cl. .......... 242/444.1; 242/443.1

[58] Field of Search .......... 242/7.03, 7.09, 242/7.08, 7.11, 444.1

[56] References Cited

U.S. PATENT DOCUMENTS

| | | | |
|---|---|---|---|
| 2,334,602 | 11/1943 | Burge . | |
| 4,817,888 | 4/1989 | Arnold | 242/7.09 |
| 4,951,889 | 8/1990 | Camardella et al. | 242/7.11 |
| 5,328,109 | 7/1994 | Takahashi | 242/7.08 |
| 5,360,178 | 11/1994 | Arnold | 242/7.09 |
| 5,397,070 | 3/1995 | Yano | 242/7.08 |

FOREIGN PATENT DOCUMENTS

| | | | |
|---|---|---|---|
| 57-134912 | 8/1982 | Japan . | |
| 63-164207 | 7/1988 | Japan . | |
| 4-151811 | 5/1992 | Japan | 242/7.09 |
| 5003128 | 5/1993 | Japan . | |

*Primary Examiner*—Katherine Matecki
*Attorney, Agent, or Firm*—Ronald P. Kananen

[57] ABSTRACT

The invention provides a coil winding apparatus which is simplified in structure, reduced in cost and improved in operation efficiency. The coil winding apparatus comprises a housing intermittently rotatable around a fixed axis between first and second positions, a plurality of spindles mounted for rotation on front and rear faces of the housing, a pair of drive sections including a bidirectional motor and provided independently of each other for transmitting rotation of the motor to rotate the spindles, an insulation sheet supply section opposed to the spindles on one of the faces of the housing when the housing is at any of the first and second positions for supplying films to bobbins mounted on the spindles, and a wire supply section for supplying wires to bobbins mounted on the other spindles. Since the drive sections are provided independently of each other for the different spindles, the directions and the speeds of rotation of the spindles can be set arbitrarily.

16 Claims, 22 Drawing Sheets

COIL WINDING APPARATUS

BACKGROUND OF THE INVENTION

This invention relates to a coil winding apparatus for producing a coil of the layer type wherein a wire and an insulation sheet are wound alternately on a bobbin.

A coil of the layer type wherein a wire and an insulation sheet are wound alternately on a bobbin is used, for example, with a flyback transformer for use with a communication apparatus such as, for example, a television set of the Braun tube type or a radar.

Various coil winding apparatus for producing a coil of the layer type are known, and one of such coil winding apparatus is disclosed, for example, in Japanese Patent Laid-Open Application No. Showa 63-164207.

The coil winding apparatus includes a frame member mounted for intermittent pivotal motion by 180 degrees around a pivot shaft, a pair of spindle trains formed on different faces of the frame member and each including a plurality of bobbin holding spindles mounted for rotation on the respective face of the frame member, drive means including a motor for transmitting rotation of the motor to the spindles of the spindle trains to rotate the spindles, insulation sheet supply means adapted to oppose one of the spindle trains at a position after the frame member is rotated and changed over by 180 degrees for supplying insulation sheets to bobbins mounted on the spindles, and wire supply means for supplying wires to the bobbins mounted on the spindles. When the insulation sheets are wound onto the bobbins mounted on the spindles of one of the spindle trains, the wires are simultaneously wound onto the bobbins mounted on the spindles of the other spindle train.

Then, after winding of the insulation sheets or the wires for a first layer, the frame member is rotated by 180 degrees so that the spindles of the one spindle train are now opposed to the wire supply means and the wires are wound onto the insulation sheets on the bobbins while the spindles of the other spindle train are opposed to the insulation sheet supply means and the insulation sheets are wound onto the bobbins. Such a sequence of operations is repeated by a predetermined number of times, and as a result of such repetition, the insulation sheets and the wires are alternately wound onto the bobbins to form coils of the layer type.

After insulation sheets and wires are wound by the predetermined number of times onto the bobbins, the bobbins are removed and new bobbins are mounted onto the spindles instead, and thereafter, the insulation sheets and the wires are wound alternately in a similar manner onto the new bobbins.

Here in the conventional coil winding apparatus, the single drive means is used commonly with the pair of spindle trains.

Generally, in such a coil winding apparatus as described above, in order to prevent possible damage to or deformation of a bobbin when a bobbin is mounted in position onto a coil winding spindle, conventionally the bobbin is set in advance to a jig which can be removably mounted onto a spindle and is transported to a working position while being carried on a pallet together with the jig, and then the jig is taken out of the pallet and set in position onto the spindle by a loader, whereafter winding is performed.

As described above, in the conventional coil winding apparatus, the single drive means is used commonly with the pair of spindle trains. However, generally the time required to wind insulation sheets onto the spindles on one of the spindle trains does not coincide with the time required to wind wires onto the spindles on the other spindle train. Accordingly, the conventional apparatus employs change-over means including a clutch mechanism interposed between each of the spindle trains and the drive means so that power transmission between the spindles and the drive means is cut on that spindle train side in which winding has been completed first while only the spindles of the other spindle train side in which winding has not been completed remain are being driven. The conventional coil winding apparatus is thus disadvantageous in that employment of such change-over means complicates the structure and results in increase in cost.

Further, there is no degree of freedom in setting the speeds and the directions of rotation of the spindles of the spindle trains. Furthermore, even if an operation for one of the spindle trains is completed, if an operation for the other spindle train is not completed, then a next winding operation cannot be started, and even an exchanging operation of bobbins including carrying in and carrying out of bobbins cannot be performed. Consequently, the conventional coil winding apparatus is disadvantageous also in that the spindles of one of the spindle trains may be inoperative for a considerably long time and the operation efficiency is low.

Further, in the bobbin supplying method in the conventional coil winding apparatus described above, since bobbins are mounted onto the spindles together with the jigs, the weights of the works are great as much, and the force required for the exchanging operation of the loader must sufficiently bear the total weight of the bobbins and the jigs. Therefore, the loader must be formed with a strong structure high in rigidity.

Accordingly, the conventional coil winding apparatus is disadvantageous also in that the weight and the size are great and the structure is complicated, resulting in a high cost for the entire apparatus.

Further, since bobbins and jigs are handled and transported all together, where a large number of bobbins are simultaneously supplied in a line operation, also a large number of jigs must be prepared. Accordingly, the conventional coil winding apparatus is disadvantageous further in that a high cost is required for the entire equipment.

In addition, in the conventional coil winding apparatus, a station where a film or a wire is wound, a loader station and a bobbin carrying in/discharging station are arranged in a plane and, when an exchanging operation or a maintenance operation of a part is to be performed, another part must be removed. Accordingly, the conventional coil winding apparatus is disadvantageous also in that the operation is cumbersome.

SUMMARY OF THE INVENTION

It is an object of the present invention to provide a coil winding apparatus which is simplified in structure, low in cost, and high in operation efficiency.

In order to attain the object described above, according to an aspect of the present invention, there is provided a coil winding apparatus, which comprises a frame member intermittently rotatable around a fixed axis between first and second positions, at least one pair of spindles mounted for rotation on different faces of the frame member, a pair of drive means including a bidirectional motor and provided independently of each other corresponding to the spindles each for transmitting rotation of the motor to a corresponding one of the spindles to rotate the spindles independently of each other at an arbitrarily set variable speed, insulation sheet supply means opposed to one of the spindles when the frame member is at any of the first and second positions for supplying an insulation sheet to a bobbin mounted on the spindle, and wire processing means for supplying a wire to another bobbin mounted on the other spindle when the frame member is at any of the first and second positions, the insulation sheet being wound onto the bobbin mounted on the one spindle while the wire is simultaneously wound onto the bobbin mounted on the other spindle.

Preferably, each of the spindles is removably mounted on the frame member so that it can be exchanged in accordance with a bobbin to be used therewith. Preferably, a plurality of spindles are provided on each of the different faces of the frame member in a mutually spaced relationship in a line parallel to the axis of the frame member, and further comprising means interposed between the frame member and the spindles for indexing winding starting and ending positions of the insulation sheet or the wire onto the bobbin.

With the coil winding apparatus, since the drive means are provided independently of each other corresponding to the spindles and the directions and the speeds of rotation of the spindles can be set arbitrarily, when winding is completed earlier on one of the spindles, the drive means which has driven the one spindle is stopped while the other drive means which is driving the other spindle with which winding is not completed as yet can remain being driven. Accordingly, a clutch mechanism or the like, which has been required in the conventional apparatus, for cutting transmission of power between the spindle and the drive means on the side on which winding has been completed earlier becomes unnecessary. Consequently, the structure is simplified.

Further, since a degree of freedom is obtained in setting the speed and the direction of rotation of the spindles in the individual spindle trains, when an operation in one side of the trains is completed, even if an operation in the other spindle train is not completed, a next winding operation or the like can be started, and besides, an exchanging operation of bobbins including carrying in or carrying out can be performed.

According to another aspect of the present invention, there is provided a coil winding apparatus, which comprises insulation sheet supply means for supplying an insulation sheet, wire supply means for supplying a wire, a film and wire winding working section for winding the insulation sheet supplied from the insulation sheet supply means and the wire supplied from the wire supply means alternately onto a bobbin, a spindle provided in the film and wire winding working section for removably mounting a bobbin thereon, a carrying in/discharging section including a bobbin holding shaft, onto which the bobbin can be removably mounted, for supplying and discharging the bobbin to and from the bobbin holding shaft, and an automatic loader section disposed between the carrying in/discharging section and the film and wire winding working section for changing over turning motion between a first position and a second position and including a pair of chucking sections individually opposed to the bobbin holding shaft positioned on the carrying in/discharging section and the spindle of the film and wire winding working section when the automatic loader section is positioned at any of the first and second positions, and control means for controlling the chucking sections to move toward and away from the spindle and the bobbin holding shaft when the automatic loader section is positioned at any of the first and second positions so as to chuck and remove bobbins on and from the spindle and the bobbin holding shaft and mount the thus removed bobbins onto the bobbin holding shaft and the spindle.

Preferably, the chucking sections of the automatic loader section are provided on only one of upper and lower faces of the automatic loader section so as to alternately oppose the bobbin holding shaft positioned on the carrying in/discharging section and the spindle of the film and wire winding working section by changing over pivotal motion of the automatic loader section. Each of the chucking sections may include a plurality of chucks disposed in a mutually spaced relationship in a line, and the operations of the chucks may be controlled commonly by the single control means.

According to a further aspect of the present invention, there is provided a coil winding apparatus, which comprises insulation sheet supply means for supplying an insulation sheet, wire supply means for supplying a wire, a film and wire winding working section for winding the insulation sheet supplied from the insulation sheet supply means and the wire supplied from the wire supply means alternately onto a bobbin, a spindle provided in the film and wire winding working section for removably mounting a bobbin thereon, a carrying in/discharging section including a bobbin holding shaft, onto which the bobbin can be removably mounted, for supplying and discharging the bobbin to and from the bobbin holding shaft, and an automatic loader section disposed between the carrying in/discharging section and the film and wire winding working section for changing over turning motion between a first position and a second position and including first and second chucking sections provided symmetrically on upper and lower faces, respectively, of the automatic loader section so as to be opposed to the bobbin holding shaft positioned on the carrying in/discharging section and the spindle of the film and wire winding working section when the automatic loader section is positioned at any of the first and second positions, the spindle of the film and wire winding working section being opposed to the first chucking section while the bobbin holding shaft is opposed to the second chucking section, the film and wire winding working section, the automatic loader section and the carrying in/discharging section being disposed substantially like stairs.

With the coil winding apparatus, since bobbins can be set directly onto spindles and transported without using a jig for a bobbin which is also used to transport a bobbin, the force for moving a bobbin in a loading section can be reduced. Consequently, the chucking section of the loader section can be produced with a simple structure and a small size. Further, the necessity of producing a large number of jigs is eliminated.

Furthermore, since bobbins can be set directly on the spindles without using a jig for a bobbin, there is no possibility that the accuracy may be deteriorated by abrasion of the jig or a spindle upon setting of the jig.

In addition, since the film and wire working section, the automatic loader section and the carrying in/discharging section are disposed substantially like stairs, an exchanging operation of a part, a maintenance operation or the like from the operator side can be performed readily.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 9:
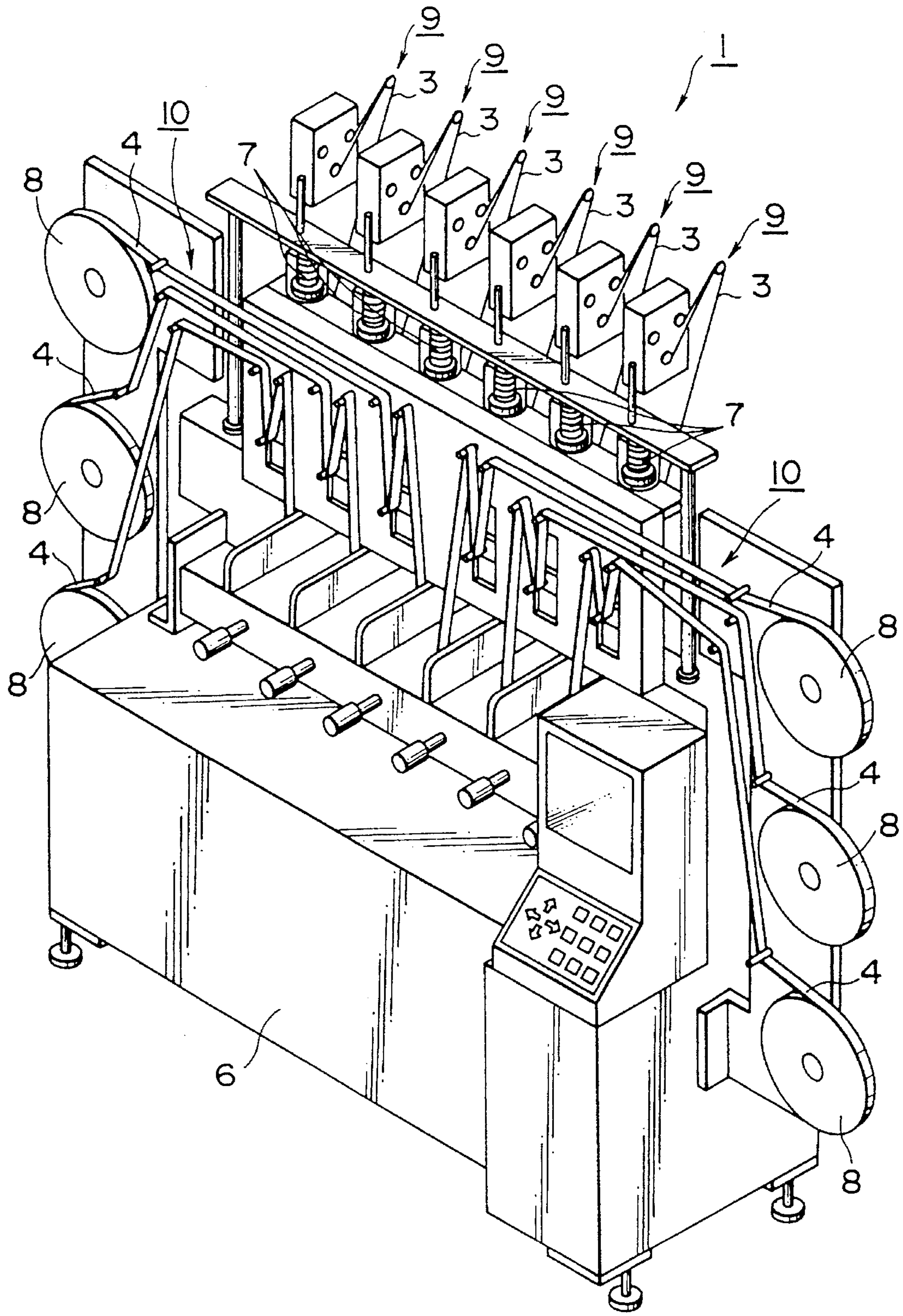
FIG. 9 is a perspective view showing an appearance of the entire coil winding apparatus of the embodiment of the present invention.

Referring first to FIG. 9, there is shown an appearance of an entire coil winding apparatus according to a preferred embodiment of the present invention. The coil winding apparatus is generally denoted at 1 and is used to produce a coil of the layer type wherein a wire 3 and a film 4 as an insulation sheet are wound alternately on a bobbin 2 (refer to FIG. 11). The coil winding apparatus 1 includes an apparatus body 6, and a plurality of stock bobbins 7 and a plurality of film stock drums 8 exchangeably mounted on the apparatus body 6 for stocking wires 3 and films 4 thereon, respectively. The wires 3 and the films 4 are introduced by way of wire supply means 9 in the form of guide rollers or the like and film supply means 10 as insulation sheet supply means, respectively, to predetermined positions at upper locations of the apparatus body 6, from which they are supplied into the apparatus body 6.

Figure 10:
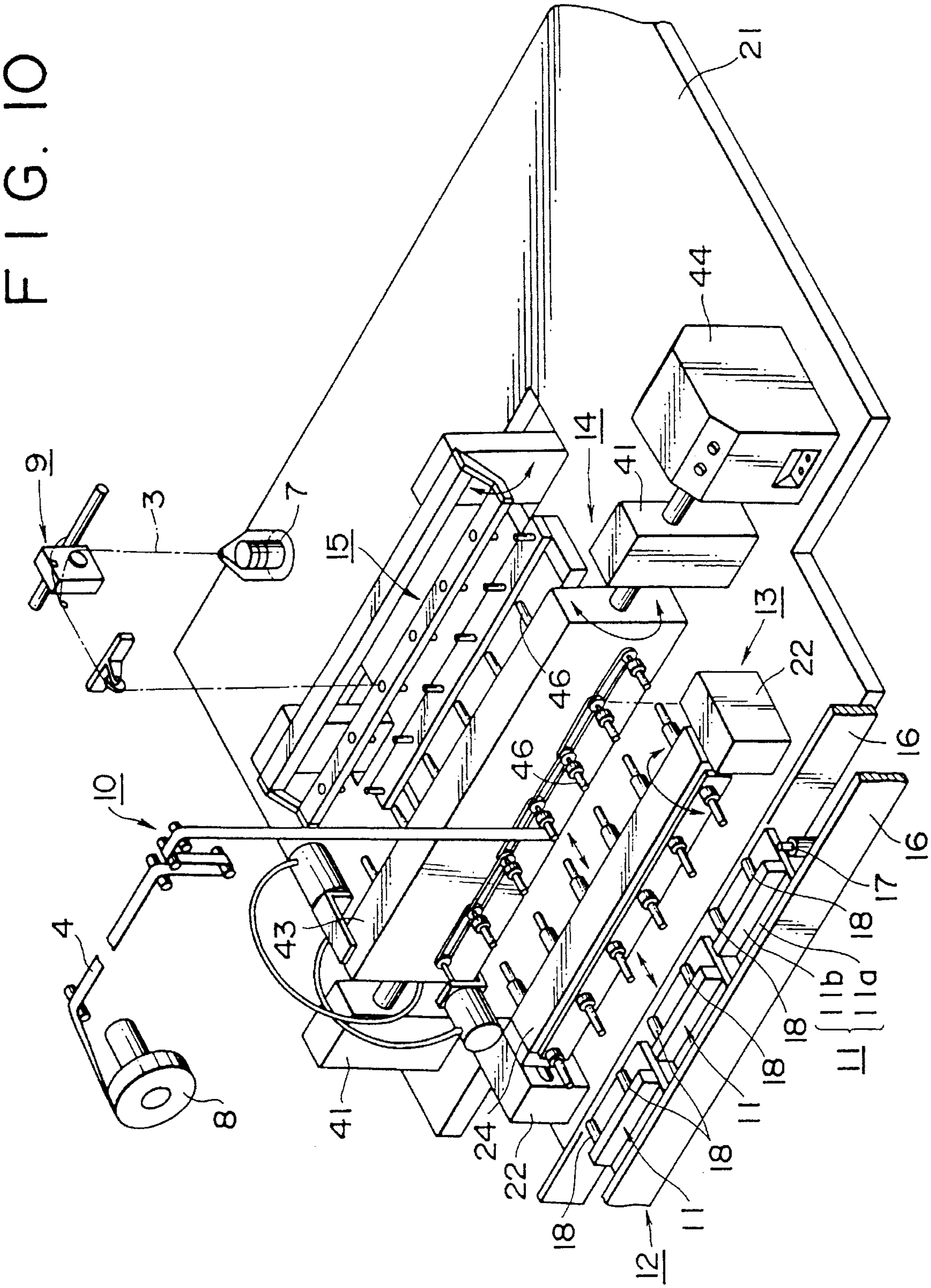
FIG. 10 is a schematic perspective view showing an arrangement of essential components of the coil winding apparatus shown in FIG. 9.

FIG. 10 shows an arrangement of essential components of the coil winding apparatus 1. Referring to FIG. 10, the coil winding apparatus 1 roughly includes a carrying in/discharging section 12 in which pallets 11 for feeding bobbins 2 to respective carrying in/discharging positions are disposed, an automatic loader section 13 for supplying and discharging such bobbins 2, a film and wire winding working section 14 for winding wires 3 supplied from the wire supply means 9 and films 4 supplied from the film supply means 10 alternately onto the bobbins 2, a wire terminal processing section 15 for entangling end portions of wires 3 wound on bobbins 2 with terminals of the bobbins 2, and so forth.

Subsequently, detailed constructions of the carrying in/discharging section 12, the automatic loader section 13 and the film and wire winding working section 14 will be described in order.

[Construction of the Carrying in/Discharging Section 12]

Figure 11:
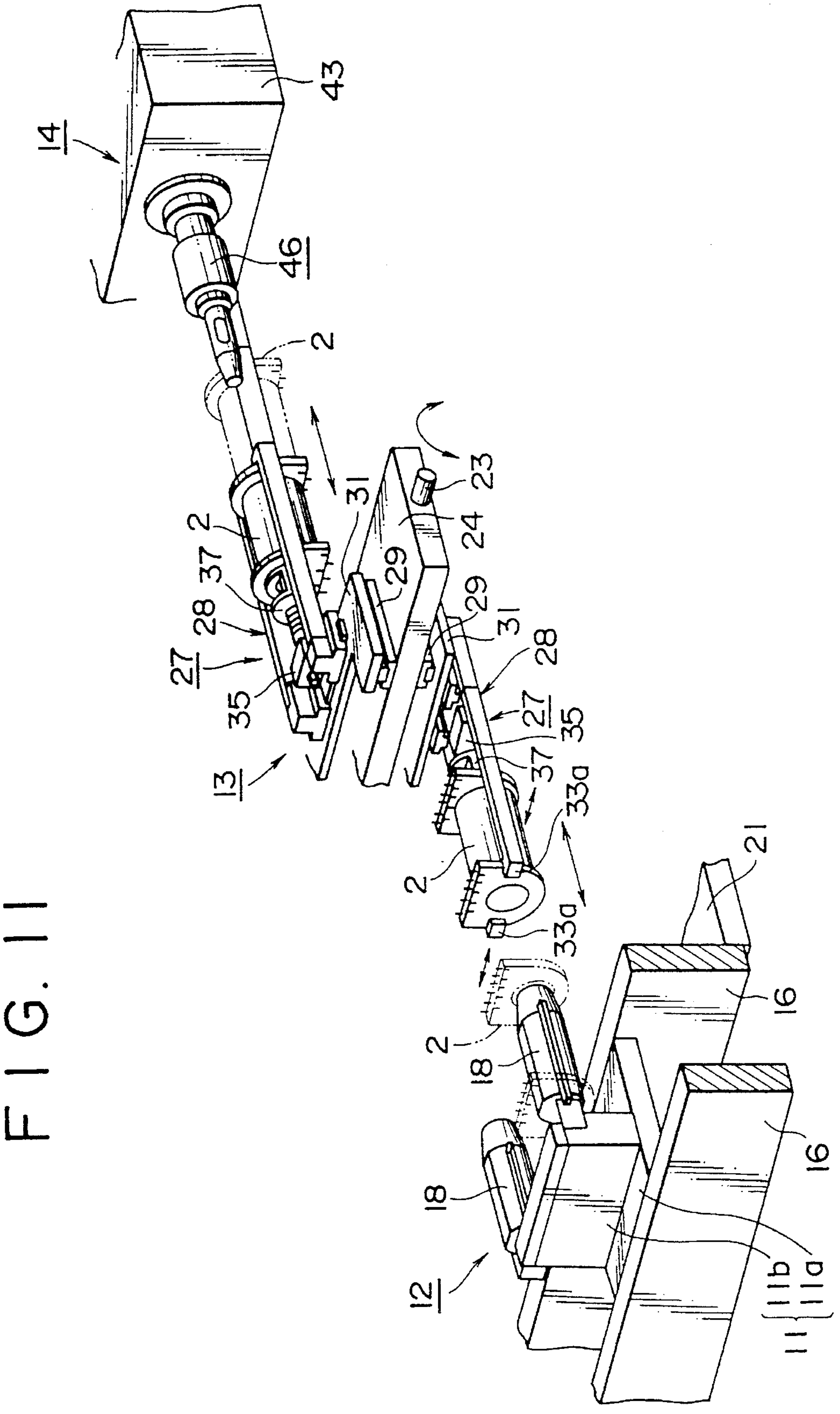
FIG. 11 is a schematic perspective view showing an arrangement of essential components of the coil winding apparatus shown in FIG. 9.

The carrying in/discharging section 12 is shown also in FIG. 11 which shows an arrangement of essential components of the coil winding apparatus 1. Thus, the construction of the carrying in/discharging section 12 will be described below with reference to FIGS. 10 and 11.

The carrying in/discharging section 12 includes a pair of parallel rails 16 for guiding the pallets 11 during movement of them. The parallel rails 16 are provided in such a condition that they are elongated leftwardly and rightwardly of the apparatus body 6. A plurality of stoppers 17 (refer to FIG. 10) are disposed between the parallel rails 16 for stopping the pallets 11 at predetermined positions in the carrying in/discharging section 12.

Each of the pallets 11 has a substantially inverted T-shape and has a horizontal portion 11*a* held between the parallel rails 16 and a vertical wall portion 11*b* extending upwardly from the horizontal portion 11*a*. In addition, a pair of bobbin holding shafts 18 are provided in a leftwardly and rightwardly spaced relationship from each other on the vertical wall portion 11*b* such that they extend horizontally in parallel to each other toward the automatic loader section 13. Each of the bobbin holding shafts 18 can be exchanged in accordance with the shape or the like of a bobbin 2 to be used, and a bobbin 2 can be removably mounted in position onto each of the bobbin holding shafts 18. The bobbin holding shafts 18 may, in some cases, be exchanged together with their pallet 11.

In the present embodiment, three such pallets 11 make one group, that is, six bobbin holding shafts 18 make one group, and are fed from a bobbin supply section not shown, to which empty bobbins 2 are supplied, to the carrying in/discharging positions of the carrying in/discharging section 12, whereafter they are moved along a route, along which bobbins 2 after being assembled are fed to a discharging position at which they are to be discharged, by a transporting operation by transport drive means not shown.

In the bobbin supply section, empty bobbins 2 are supplied to the bobbin holding shafts 18, and then at the carrying in/discharging positions of the carrying in/discharging section 12, the empty bobbins 2 and the bobbins 2 after being assembled are exchanged between the bobbin holding shafts 18 and the automatic loader section 13, whereafter the bobbins 2 after being assembled are discharged at the discharging position.

[Construction of the Automatic Loader Section 13]

Figure 12:
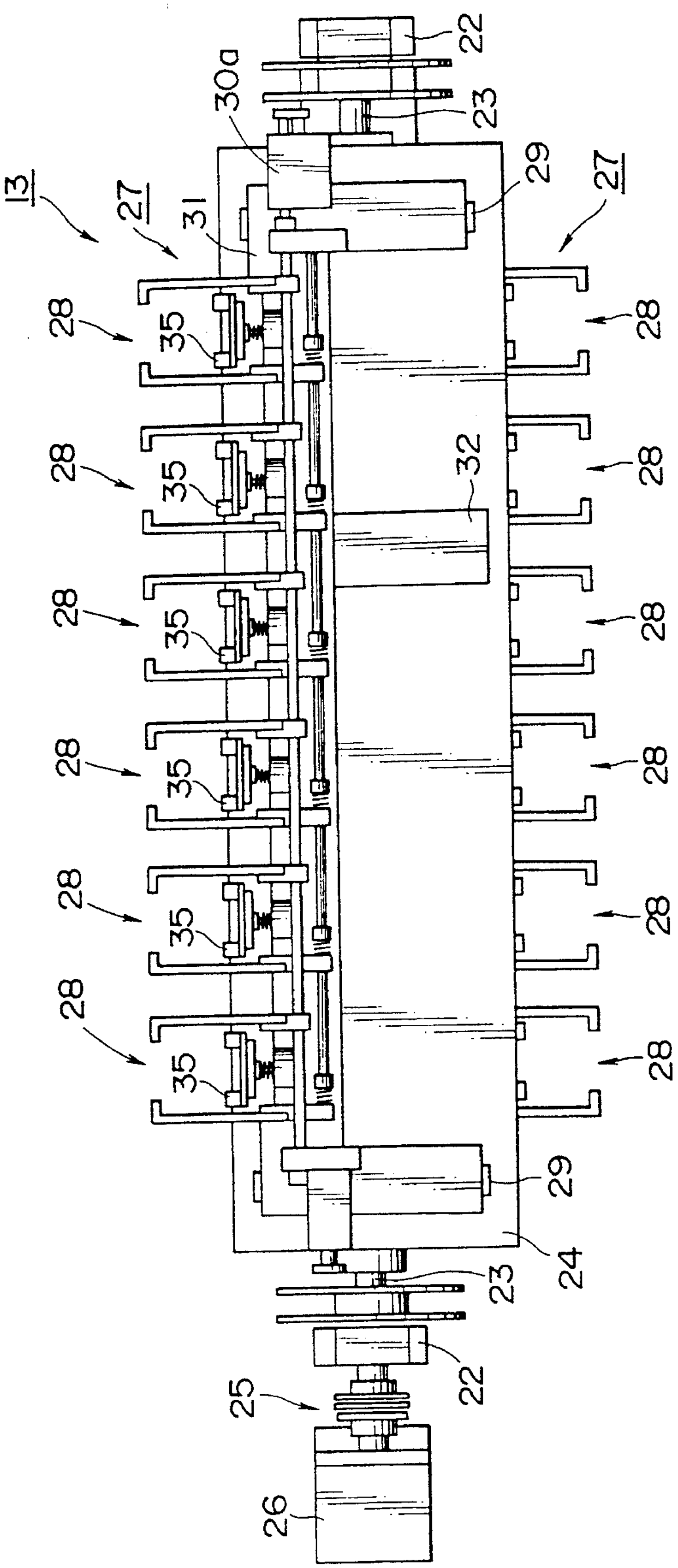
FIG. 12 is a top plan view of an automatic loader section of the coil winding apparatus shown in FIG. 9.
Figure 13:
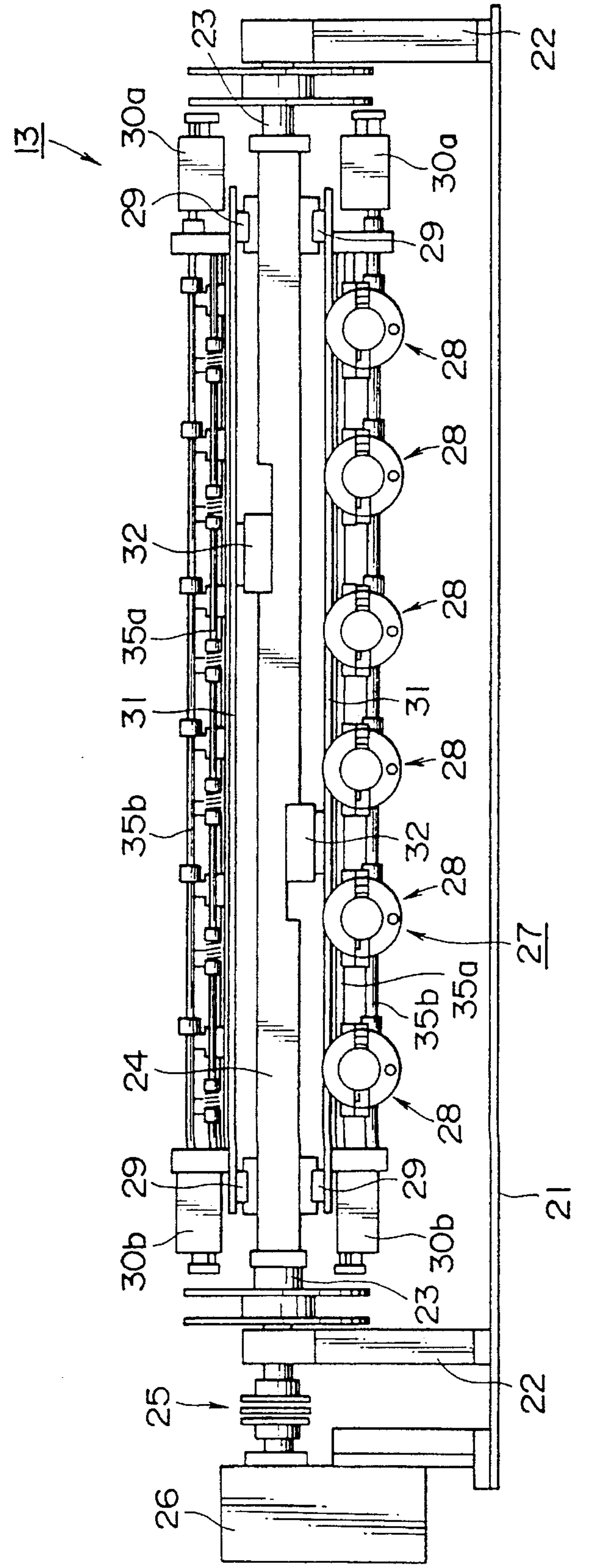
FIG. 13 is a side elevational view of the automatic loader section shown in FIG. 12.

The automatic loader section 13 is shown, in addition to FIG. 10, in FIGS. 11, 12 and 13. Here, FIG. 12 is a top plan view of the automatic loader section 13, and FIG. 13 is a side elevational view of the automatic loader section 13.

Thus, the construction of the automatic loader section 13 will be described with reference to FIGS. 10 to 13. The automatic loader section 13 is disposed in a parallel, opposing relationship to the carrying in/discharging section 12 behind the carrying in/discharging section 12 on a base plate 21 secured to the apparatus body 6.

Roughly speaking, the automatic loader section 13 includes a pair of support posts 22 secured in a leftwardly and rightwardly spaced relationship from each other on the base plate 21, a rotatable plate 24 having a pair of rotary shafts 23 attached to the opposite ends thereof and supported for integral rotation with the rotary shafts 23 on the support posts 22, an index 26 (refer to FIGS. 12 and 13) secured to the base plate 21 adjacent and connected to one of the rotary shafts 23 by way of a coupling 25 and including a motor (not shown) for rotating the rotatable plate 24 back and forth by 180 degrees alternately between a pair of positions in each of which the upper and lower faces of the rotatable plate 24 oppose and extend in parallel to the base plate 21.

In addition, a pair of chucking sections 27 are provided on the upper and lower faces of the rotatable plate 24. The chucking sections 27 are provided in a symmetrical relationship with respect to a point on the upper and lower faces of the rotatable plate 24 such that they extend in the leftward and rightward directions (in the direction in which the rotary shafts 23 extend) each at a position displaced rearwardly on the corresponding face of the rotatable plate 24 so that, when one (an upper one) of the chucking sections 27 is disposed at a position opposite the film and wire winding working section 14, the other (lower) chucking section 27 is positioned at another position opposite the carrying in/discharging section 12.

Accordingly, in regard to the positional relationship between the film and wire winding working section 14 and the carrying in/discharging section 12 here, the carrying in/discharging section 12 is located at the frontmost position while the automatic loader section 13 and the film and wire winding working section 14 are juxtaposed in this order behind the carrying in/discharging section 12. Further, the carrying in/discharging section 12 is located at the lowest position while the automatic loader section 13 and the film and wire winding working section 14 are positioned at higher positions in this order substantially like stairs or in tiers. In other words, in the structure of the present embodiment, the carrying in/discharging section 12, the automatic loader section 13 and the film and wire winding working section 14 are juxtaposed like stairs in this manner so that they may not be disposed on the same plane thereby to facilitate a part exchanging operation or a maintenance operation by an operator.

Each of the chucking sections 27 on the rotatable plate 24 has six chucks 28 provided in an equidistantly spaced relationship from each other in the leftward and rightward directions thereon and has a pair of left and right plungers **30*a* and 30*b* (refer to FIG. 13) provided thereon for causing the chucks 28 to perform opening and closing operations. The plungers 30*a* and 30*b* and the chucks 28 are disposed on a slide plate 31 mounted on the rotatable plate 24 for sliding movement in the forward and rearward directions by way of a pair of left and right slide members 29. The chucks 28 are constructed in a same structure. It is to be noted that the changing over of the slide plate 31 between the front and rear positions is performed by an operation of a cylinder 32 fixedly mounted on the rotatable plate 24**.

Figure 14:
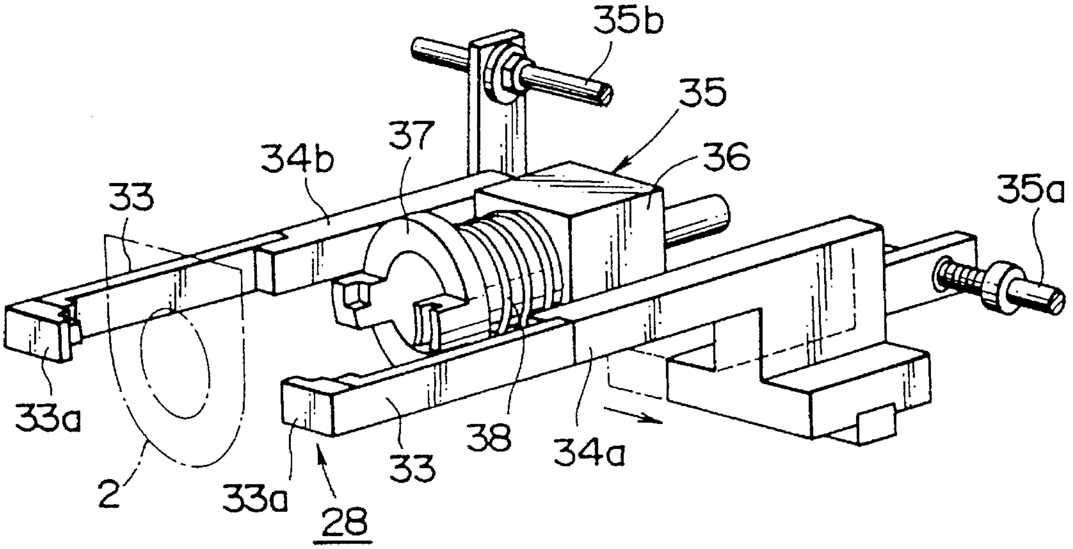
FIGS. 14 and 15 are perspective views illustrating different stages of operation of a chuck of the automatic loader section shown in FIG. 12.
Figure 15:
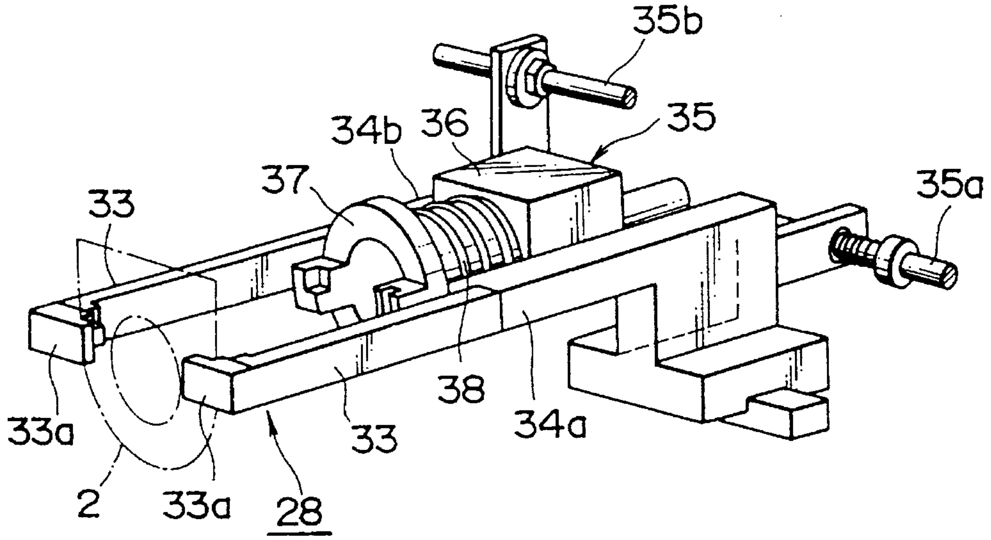

FIGS. 14 and 15 illustrate operation of a chuck 28 of the automatic loader section 13. Thus, the construction of each chuck 28 will be further described with reference to FIGS. 14 and 15.

Each of the chucks 28 includes a pair of left and right arm members **34*a* and 34*b* each having a pawl 33 in the form of a hook provided at an end thereof, a bobbin receiver 35 mounted fixedly on the slide plate 31 between the arm members 34*a* and 34*b***, and so forth.

The arm members **34*a* are fixedly mounted commonly on a rod 35*a* which is changed over to be moved move leftwardly or rightwardly by the plunger 30*a* while the other arm members 34*b* are fixedly mounted commonly on another rod 35*b* which is similarly changed over to be moved leftwardly or rightwardly by the plunger 30*b*. When the plungers 30*a* and 30*b* are operated in their opening directions, the movements are transmitted to the arm members 34*a* and 34*b* by way of the rods 35*a* and 35*b* so that the arm members 34*a* and 34*b* are moved in directions spaced away from each other together with the rods 35*a* and 35*b*, respectively, until they reach their open positions (refer to FIG. 14). On the contrary, when the plungers 30*a* and 30*b* are operated in their closing directions, the movements are transmitted to the arm members 34*a* and 34*b* by way of the rods 35*a* and 35*b* so that they are moved in directions toward each other together with the rods 35*a* and 35*b*, respectively, until they reach their closed positions (refer to FIG. 15**).

The bobbin receiver 35 includes a base 36 secured to the slide plate 31, a positioning member 37 mounted for sliding movement in the forward and rearward directions on the base 36, a coil spring 38 for biasing the positioning member 37 to project toward the ends of the arm members **34*a* and 34*b***, and so forth.

The bobbin receiver 35 is thus projected by the biasing force of the coil spring 38, when a bobbin 2 is not chucked by the arm members **34*a* and 34*b*, to such an extent that the distance from the end of the bobbin receiver 35 to the inner sides of hooked portions 33*a* of the pawls 33 is smaller than the length of the bobbin 2. On the other hand, when a chucking operation is performed, the bobbin receiver 35 is pushed by the bobbin 2 against the biasing force of the coil spring 38 so that it is moved rearwardly under the guidance of the base 36, and after the bobbin 2 is chucked, the bobbin 2 is acted to be resiliently held between the hooked portions 33*a* and the end of the bobbin receiver 35 and consequently can be held without any play by the biasing action of the coil spring 38**.

[Construction of the Film and Wire Winding Working Section 14]

Figure 1:
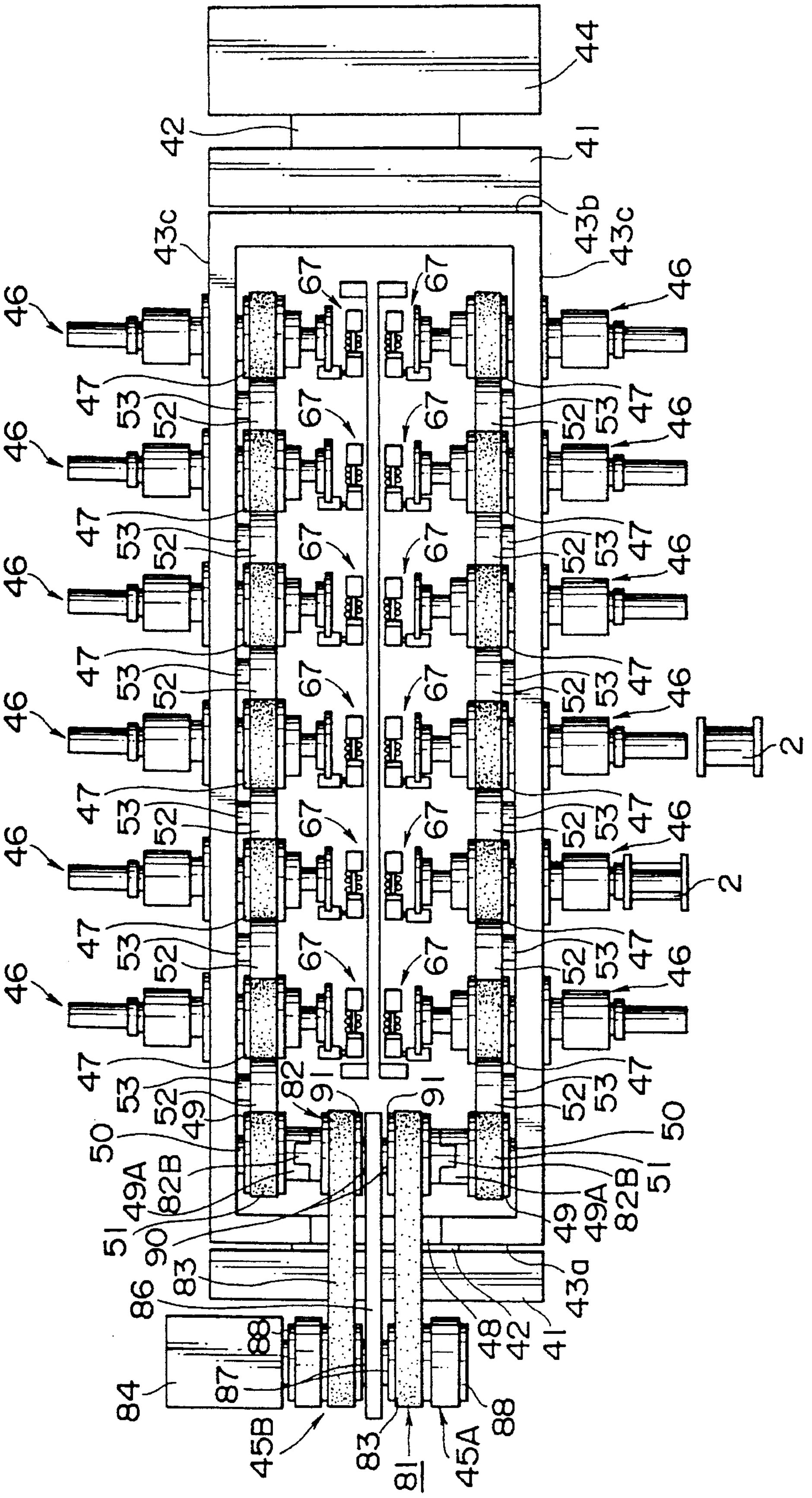
FIG. 1 is a top plan view of a film and wire winding working section of a coil winding apparatus showing a preferred embodiment of the present invention.
Figure 2:
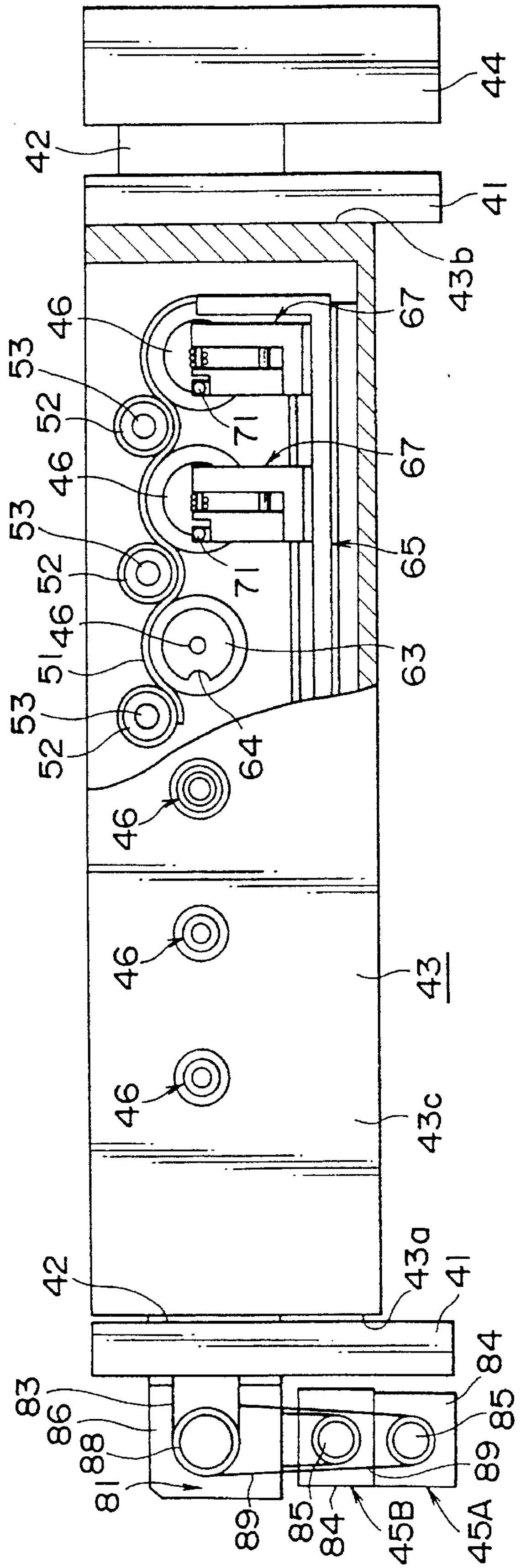
FIG. 2 is a front elevational view, partly in section, of the film and wire winding working section shown in FIG. 1.
Figure 3:
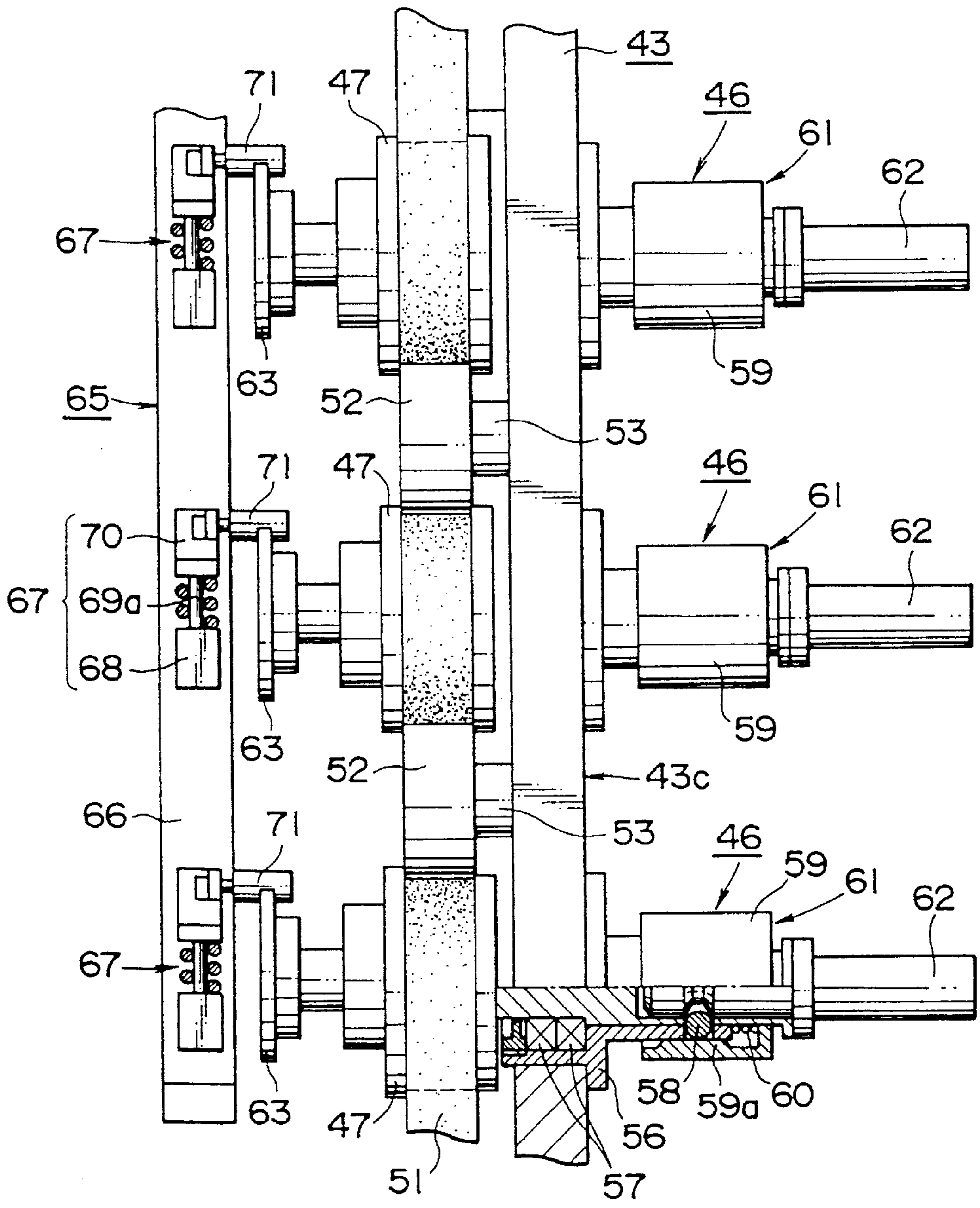
FIG. 3 is a partial enlarged top plan view, partly in section, of the film and wire winding working section shown in FIG. 1.
Figure 4:
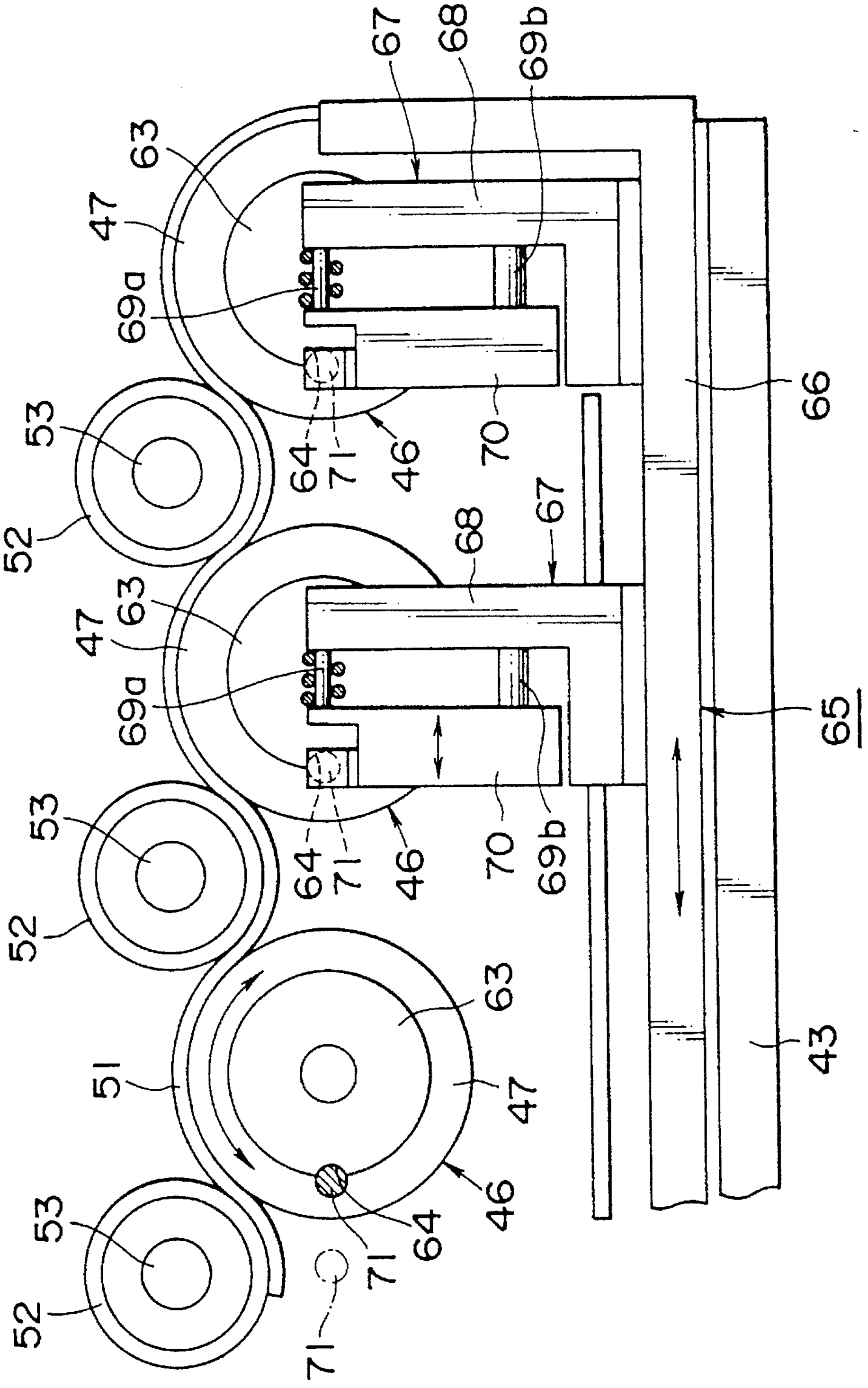
FIG. 4 is a partial enlarged front elevational view of the film and wire winding working section shown in FIG. 1.
Figure 5:
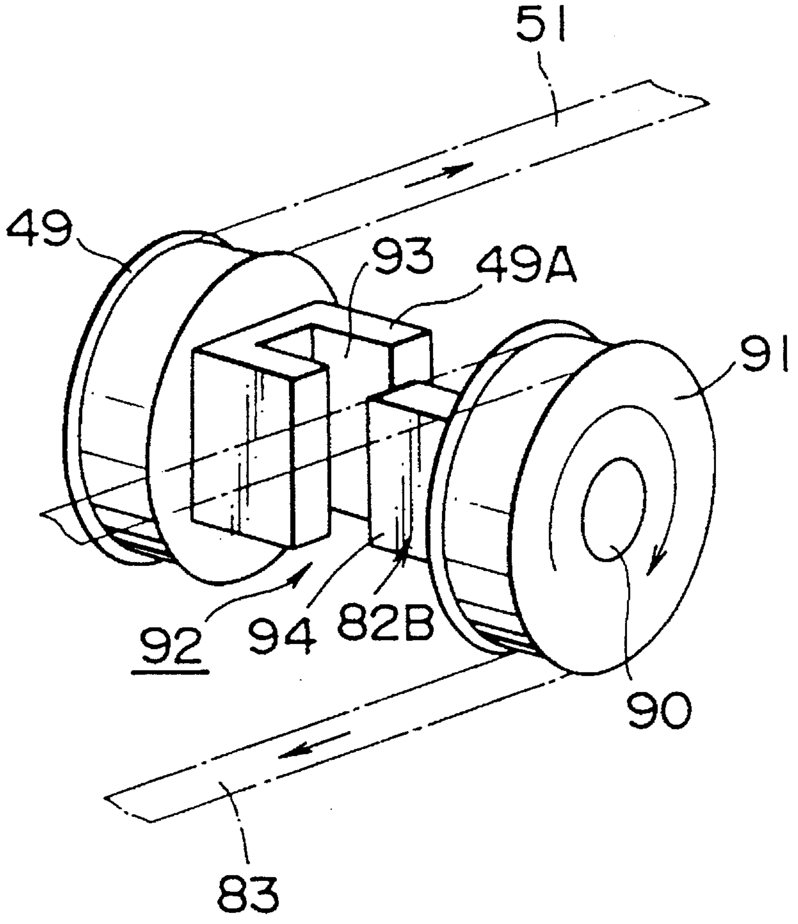
FIG. 5 an enlarged perspective view of a coupling mechanism of the film and wire winding working section shown in FIG. 1.
Figure 6:
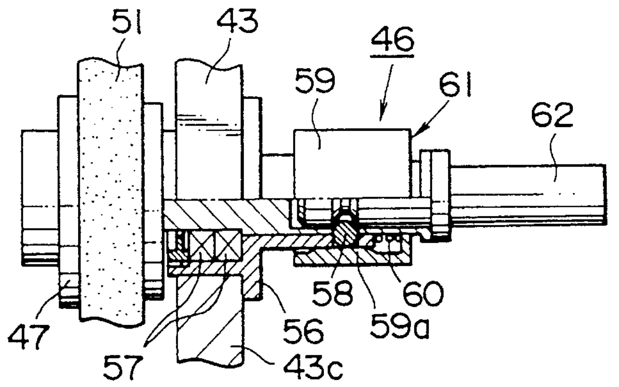
FIGS. 6 to 8 are partial enlarged views, partly in section, showing different stages of operation of a spindle of the film and wire winding working section shown in FIG. 1.
Figure 7:
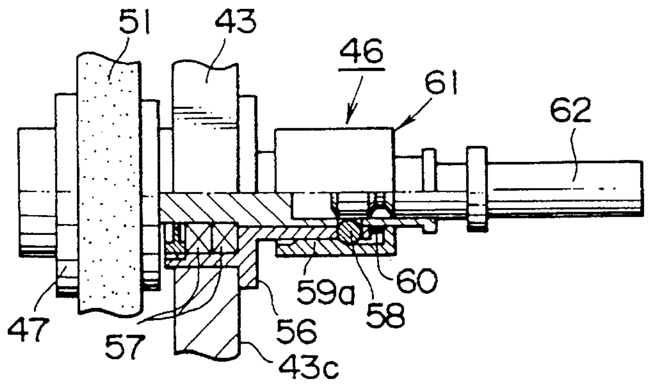
Figure 8:
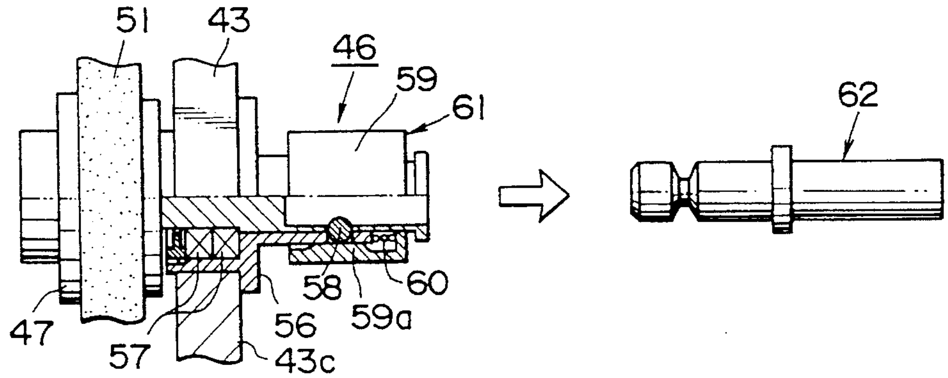

The film and wire winding working section 14 is shown, in addition to FIG. 10, in FIGS. 11, 1, 2, 3, 4 and 5. In particular, FIG. 1 is a top plan view of the film and wire winding working section 14; FIG. 2 is a front elevational view, partly broken, of the film and wire winding working section 14, FIGS. 3 and 4 are enlarged views of the essential part of the film and wire winding working section 14; and FIG. 5 is an enlarged perspective view of the essential part of the coupling mechanism of the film and wire winding working section 14.

Thus, the construction of the film and wire winding working section 14 will be described below with reference to FIGS. 1, 2, 3, 4, 5, 10 and 11.

The film and wire winding working section 14 is disposed in a parallel, opposing relationship to the automatic loader section 13 on the base plate 21 secured to the apparatus body 6 behind the automatic loader section 13.

Further, wires 3 led out from stock bobbins 7 by the wire supply means 9 are introduced by way of the wire terminal processing section 15 to locations above the film and wire winding working section 14, and films 4 led out from film stock drums 8 by the film supply means 10 are introduced to locations above the film and wire winding working section 14.

Further, the film and wire winding working section 14 roughly includes a pair of support posts 41 secured in a leftwardly and rightwardly spaced relationship from each other on the base plate 21, a housing 43 in the form of a flattened box which has a pair of rotary shafts 42 mounted at the opposite ends thereof and supported for integral rotation with the rotary shafts 42 on the corresponding support posts 41, an index 44 including a motor (not shown) and secured to the base plate 21 adjacent and connected to one of the rotary shafts 42 by way of a coupling not shown to transmit rotation thereof to the rotary shaft 42 for turning the housing 43 back and forth by 180 degrees alternately between a pair of positions in which the upper and lower faces of the housing 43 oppose and extend in parallel to the base plate 21, a pair of drive means 45A and 45B, and so forth.

Describing in more detail, the housing 43 is formed as a flattened box in the form of a hexahedron having top and bottom, left and right, and front and rear faces and opened at the top thereof. The rotary shafts 42 are mounted substantially at the centers of the left and right faces 43*a* and 43*b* of the housing 43, and six spindles 46 are mounted for rotation on each of the front and rear faces 43*c*, that is, a total of 12 spindles are mounted for rotation on the front and rear faces 43*c*. It is to be noted that the spindles 46 mounted on the individual faces 43*c* correspond to the chucks 28 of the automatic loader section 13 and are formed in a spaced relationship from each other by a distance equal to the distance between the chucks 28. Further, each of the spindles 46 has a friction wheel 47 mounted for integral rotation therewith on the inner side of the housing 43.

Further, another friction wheel 49 having a coupling 49A provided for integral rotation at an end thereof is mounted for rotation by way of a rotary shaft 50 on the inner side of each of the front and rear faces 43*c* of the housing 43 in a corresponding relationship to the friction wheels 47 of the spindles 46. In addition, on each of the front and rear faces 43*c*, an endless belt 51 for power transmission extends commonly between the friction wheel 49 and the six friction wheels 47. Similarly, on the inner side of each of the front and rear faces 43*c* of the housing 43, auxiliary friction wheels 52 for a pressing operation are mounted between the friction wheel 49 and an adjacent one of the friction wheels 47 and between the friction wheels 47 each by way of a rotary shaft 53. Thus, the endless belt 51 is pressed against the friction wheels 47 by the auxiliary friction wheels 52 to allow transmission of power between the friction wheel 49 and the friction wheels 47. In other words, with the structure, when the friction wheel 49 is rotated, also the six friction wheels 47 are rotated simultaneously in the same direction by way of the endless belt 51.

Each of the spindles 46 is mounted for rotation on a tubular bearing case 56 by way of a bearing 57 disposed in the bearing case 56. The bearing case 56 is fixedly mounted on the housing 43 and extends through the front or rear wall 43*c* of the housing 43 as shown in FIGS. 3, 6, 7 and 8.

Further, a chuck 61 is provided at an end portion of each of the spindles 46 which projects outwardly of the housing 43. The chuck 61 includes a ball 58, a locking cap 59 having a locking cam 59*a* on an inner face thereof, a coil spring 60, and so forth. A bobbin mounting shaft 62 can be arbitrarily exchanged for another bobbin mounting shaft suitable for the type of a bobbin 2 to be used by unlocking and locking operations of the chuck 61. It is to be noted that the mechanism for exchangeably chucking the bobbin mounting shaft 62 may be replaced by another structure which is well known, for example, as a collet chuck mechanism or the like.

On the other hand, at the other end of each of the spindles 46 which projects inwardly of the housing 43, a position control plate 63 having a positioning recess 64 (refer to FIG. 4) provided on an outer periphery thereof is fixedly mounted. The position control plate 63 is used by a clutch operation section 65 fixedly mounted on the base plate 21 side so as to perform indexing of winding starting and ending positions for winding a wire 3 or a film 4 onto a bobbin 2 mounted on the spindle 46.

The clutch operation section 65 includes, as shown in FIGS. 3 and 4, a slide plate 66 for controlling the spindles 46 of the front side spindle train and another slide plate 66 for controlling the spindles 46 of the rear side spindle train. The slide plates 66 are slidably changed over in the leftward and rightward directions by respective plungers not shown. A locking member 67 is mounted on each of the slide plates 66 corresponding to the position control plate 63 for each of the spindles 46.

Each of the locking members 67 includes a base plate 68 secured to one of the slide plates 66, a movable plate 70 mounted for sliding movement on the base plate 68 by way of a pair of guide bars 69*a* and 69*b*, a positioning pin 71 provided on the movable plate 70 and projecting toward the corresponding position control plate 63, and a coil spring 72 for normally biasing the movable plate 70 toward the free ends of the guide bars 69*a* and 69*b*.

In the clutch operation section 65, when the spindles 46 are rotating, the corresponding slide plate 66 is held at a left position in FIG. 4 to which it is moved by an operation of the corresponding plunger not shown and at which each of the positioning pins 71 is disposed at such a position (71) as indicated by an alternate long and short dash line in FIG. 4. But on the contrary when the spindles 46 are stopped, the slide plate 66 is moved rightwardly in FIG. 4 to another position at which each of the positioning pins 71 is abutted with an outer periphery of the corresponding position control plate 63. Then, when the positioning pin 71 is opposed to the positioning recess 64 of the position control plate 63, it is engaged into the positioning recess 64 as indicated by a solid line in FIG. 4 so that the spindle 46 can be stopped at the thus defined position. The winding starting and ending positions of the spindles 46 can be indexed in this manner.

The drive means 45A and 45B are disposed in a corresponding relationship to a side face of the housing 43 on the side of the housing 43 on which an opening 48 is formed (refer to FIG. 1). The drive means 45A and 45B have substantially symmetrical configurations and each includes an outer side rotary member 81 and an inner side rotary member 82. The outer side rotary member 81 and the inner side rotary member 82 are power-coupled by a power transmission belt 83 disposed across the opening 48.

The outer side rotary member 81 includes a motor 84 fixedly mounted on the base plate 21 outside the housing 43, a pulley 85 secured to an output shaft of the motor 84, another pulley 88 mounted for rotation by way of a shaft 87 on a base member 86 secured to the base plate 21, and a power transmission belt 89 extending between the pulley 88 and the pulley 85. Thus, rotation of the motor 84 can be transmitted to the pulley 88 by way of the power transmission belt 89. It is to be noted that also the power transmission belt 83 extends around the pulley 88.

Meanwhile, the inner side rotary member 82 is disposed at a position corresponding to each of the couplings 49A on the housing 43. A pulley 91 is mounted for rotation on the base member 86 by way of a shaft 90, and the power transmission belt 89 extends between the pulley 91 and the pulley 88. Further, the pulley 91 has a coupling 82B integrally formed thereon for being coupled to the coupling 49A to transmit rotation of the pulley 91 to the corresponding friction wheels 49.

The coupling 49A and the coupling 82B construct a coupling mechanism 92 (refer to FIG. 5) for power transmission between the drive means 45A or 45B and the spindles 46. The coupling mechanism 92 is constituted from, as shown in detail in FIG. 5, an engaging groove 93 provided on the coupling 49A side and a projection 94 provided on the coupling 82B side for being inserted and engaged in the engaging groove 93.

With the coupling mechanism 92, upon rotation of the pulley 91 around the shaft 90, the coupling 49A and the coupling 82B are coupled to each other so that they rotate integrally with each other. In contrast, when the housing 43 is rotated by the index 44 while the engaging groove 93 is positioned perpendicularly to the base plate 21, the projection 94 is disengaged from the engaging groove 93 so that only the housing 43 side can rotate around the rotary shaft 42. It is to be noted that the coupling 49A and the coupling 82B are set so that they are stopped, when the spindles 46 are to be indexed for the winding starting and ending positions by the clutch operation section 65 described hereinabove, in a condition wherein the engaging groove 93 is positioned perpendicularly to the base plate 21.

Figure 16:
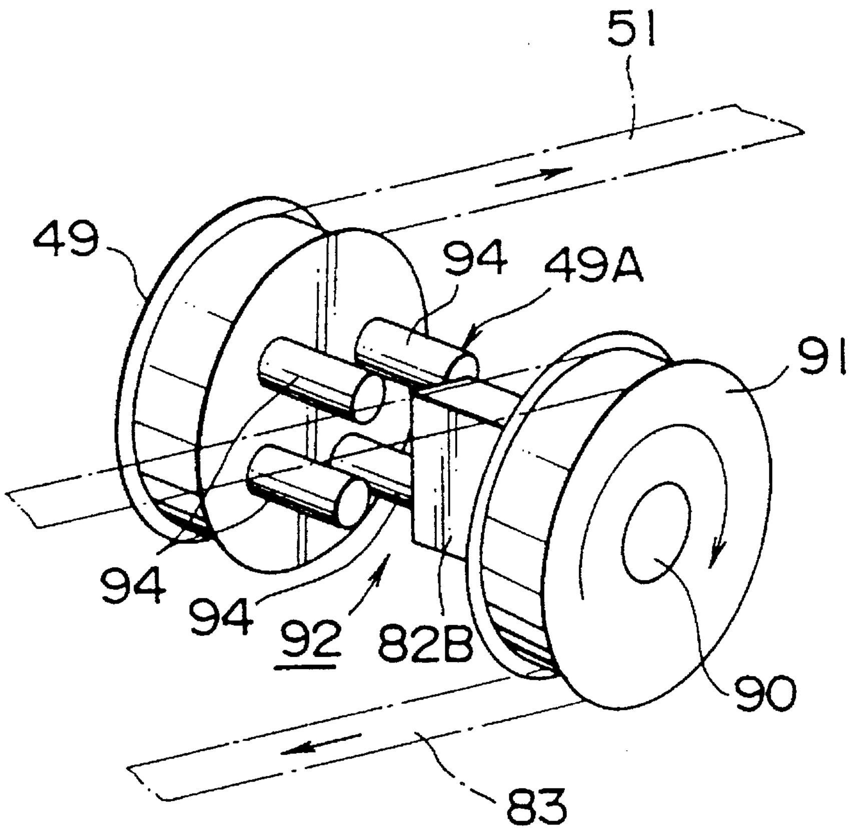
FIGS. 16 to 18 are perspective views showing different modifications to the coupling mechanism shown in FIG. 5.
Figure 17:
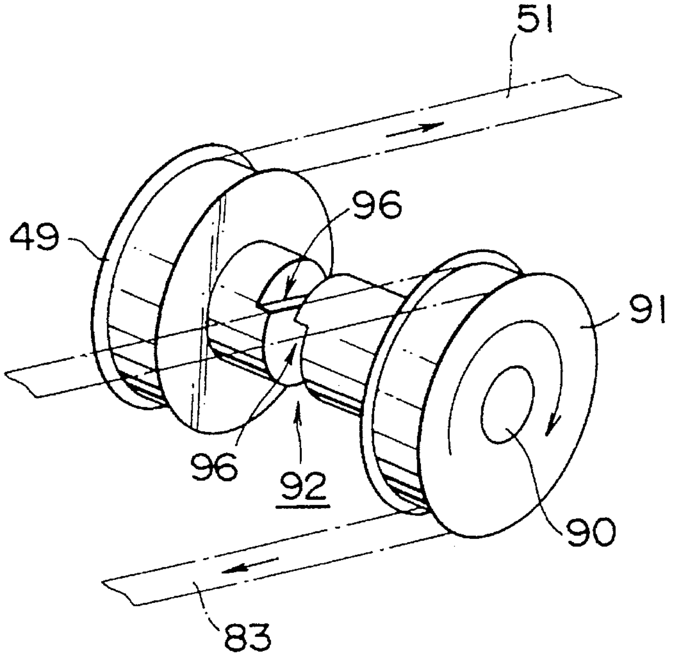
Figure 18:
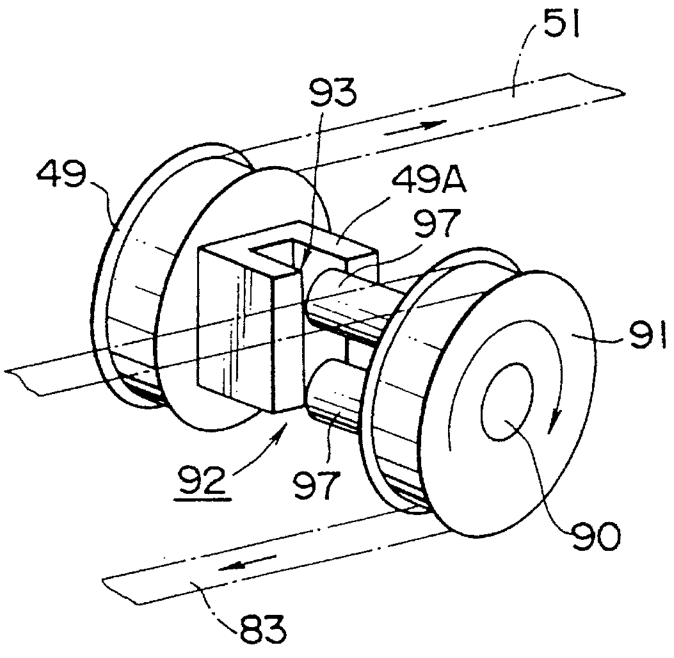

It is to be noted that the coupling 49A and the coupling 82B of the coupling mechanism 92 may otherwise have such structures as shown in FIGS. 16, 17 and 18.

In particular, in the modified structure of FIG. 16, the engaging groove 93 provided on the coupling 49A is formed by four projections 94.

Meanwhile, in the modified structure of FIG. 17, the coupling 49A and the coupling 82B have stepped or offset portions 96 for engaging each other.

Further, in the modified structure of FIG. 18, the projection 94 provided on the coupling 82B is formed from two pin-like elements 97.

Subsequently, the wire terminal processing section 15 will be described in detail with reference to FIG. 19 which schematically shows the construction of a form of the wire terminal processing section 15 and the film and wire winding working section 14 according to the present invention. The film and wire winding working section 14 includes the housing 43 mounted for rotation on the pair of support posts 41 secured to the base plate 21 back and forth by 180 degrees by way of the rotary shaft 42, a spindle 46 mounted for rotation on a side face of the housing 43, and so forth. Meanwhile, the wire terminal processing section 15 includes a nozzle member 105 for supplying a wire 3, a wire chucking section 106 for holding an end of the wire 3, a cutting mechanism 107 for cutting the wire 3 at a required position, and so forth. Meanwhile, the spindle 46 is alternately positioned by rotational changing over of the housing 43 between a position at which the wire 3 is wound (position shown in FIG. 19) and another position at which a film 4 is wound (position adjacent the automatic loader section 13 in FIG. 10).

Figure 19:
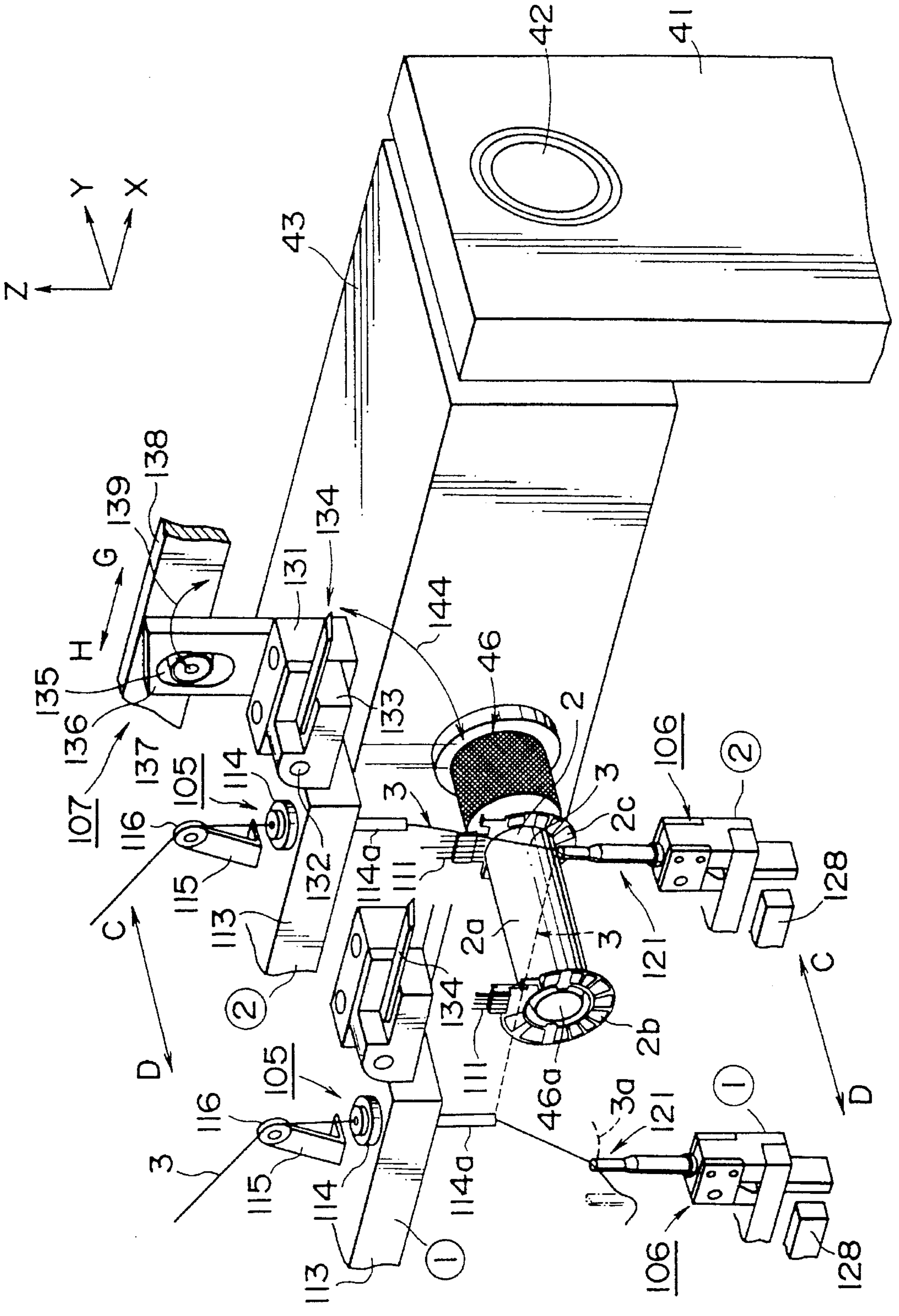
FIG. 19 is a perspective view showing the construction of a form of a wire terminal processing section of the coil winding apparatus shown in FIG. 9.

While only one spindle 46 is shown in FIG. 19, a plurality of spindles are mounted in a leftwardly and rightwardly distributed condition on each of the front and rear faces of the housing 43 as described hereinabove such that the spindles 46 are rotated in an interlocking relationship with each other.

Figure 20:
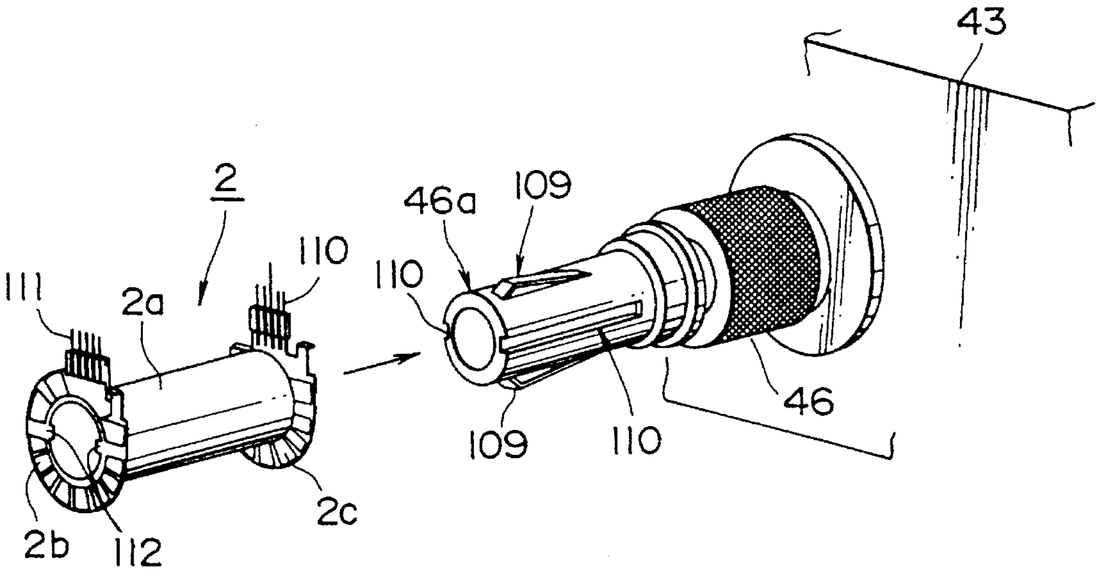
FIG. 20 is a perspective view showing details of a portion of the wire terminal processing section of FIG. 19 with a bobbin removed.
Figure 21:
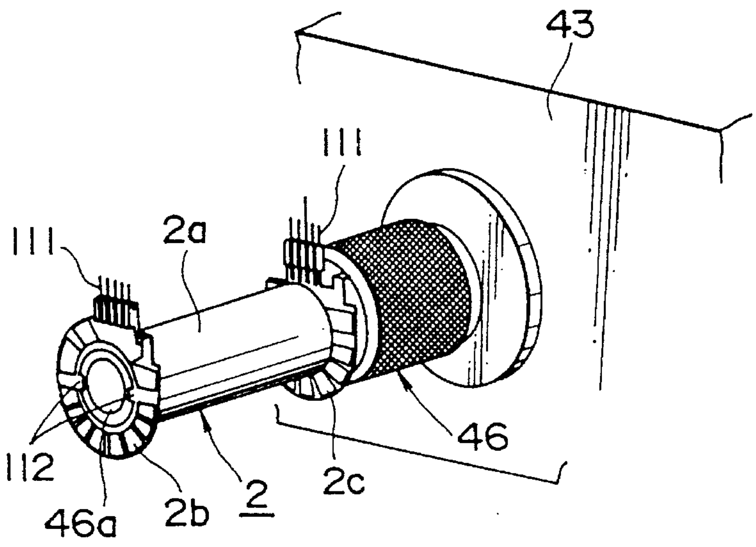
FIG. 21 is a perspective view showing details of the portion of the wire terminal processing section shown in FIG. 20 but with the bobbin mounted.

Each of the spindles 46 has, as shown in FIGS. 20 and 21, a bobbin receiving jig portion **46*a* in the form of a shaft integrally provided thereon, and a bobbin 2 is mounted at an end of the spindle 46. A pair of spring portions 109 and a pair of guide grooves 110 are formed on a circumferential face of the bobbin receiving jig portion 46*a* of the spindle 46 such that they extend in the forward and rearward directions. It is to be noted that the spring portions 109 and the guide grooves 110 are formed at locations spaced by 180 degrees from each other and the spring portions 109 are spaced by substantially 90 degrees from the guide grooves 110. Further, end portions of the spring portions 109 are inclined toward a direction in which a bobbin 2 is mounted onto the spindle 46**.

The bobbin 2 has a tubular body portion **2*a* on an outer periphery of which a wire 3 and an insulation member 4 in the form of a film are to be mounted, and a pair of flange portions 2*b* and 2*c* mounted at the opposite front and rear ends of the body portion 2*a*. A plurality of conductive terminals 111 each in the form of a pin are fixedly mounted at each of the flange portions 2*b* and 2*c*, and a pair of projections 112 are formed on an inner peripheral face of the body portion 2*a* corresponding to the guide grooves 110 of the bobbin receiving jig portion 46*a***.

When the bobbin 2 is to be mounted onto the spindle 46, it is operated so that the guide grooves 110 of the spindle 46 correspond to the projections 112 thereof, and in this condition, the bobbin receiving jig portion **46*a* is inserted into the body portion 2*a* of the bobbin 2 to mount the bobbin 2 onto the spindle 46. When the bobbin receiving jig portion 46*a* is inserted to an intermediate position of the body portion 2*a*, the spring portions 109 are contacted with the inner face of the body portion 2*a*. Thereupon, the spring portions 109 are resiliently deformed so that they are retracted into the bobbin receiving jig portion 46*a*, thereby permitting the bobbin receiving jig portion 46*a* to be further inserted into the body portion 2*a* with the spring portions 109 held in resilient contact with the inner face of the body portion 2*a* until the bobbin receiving jig portion 46*a* reaches a predetermined final position, thereby completing mounting of the bobbin 2. At the final position, the spring portions 109 are held in resilient contact with the inner face of the body portion 2*a* so that the bobbin is held for integral rotation with the spindle 46. FIG. 21 shows a condition wherein the bobbin 2 is mounted on the spindle 46** in this manner.

On the other hand, in order to remove the bobbin 2 mounted on the spindle 46, the bobbin 2 is forcibly pulled in the direction opposite to the direction in which the bobbin 2 is mounted by suitable means not shown.

The nozzle member 105 is provided on a plate 113 mounted on the apparatus body for movement in the forward and rearward directions, that is, in the direction of the Y-axis, between a chucking position indicated at reference character ① in FIG. 19 and another entangling position indicated at reference character ②. The nozzle member 105 includes a nozzle member 114 in the form of a pipe mounted on the plate 113 such that it extends vertically through the plate 113 and projects downwardly from a lower face of the plate 113, a guide roller 116 mounted on the plate 113 by way of a bracket 115 for introducing a wire 3 drawn out from a stock bobbin 7 of FIG. 10 into the nozzle member 114, and so forth. The nozzle member 114 has a nozzle 114*a* at the center thereof, and while the nozzle member 114 is moved upwardly and downwardly drawing spirals, the nozzle 114*a* entangles the wire 3 with the conductive terminal 111.

In the present embodiment, the wire 3 drawn out from the stock bobbin 7 is set so that it is first introduced, after passing the guide roller 116, into the nozzle member 114 and then drawn out from the end of the nozzle 114*a* on the lower side of the plate 113. It is to be noted that here the position of the nozzle member 105 when the plate 113 is moved to its chucking position, that is, moved as indicated by reference character ① in FIG. 19 is determined as an operation initial position.

Figure 22:
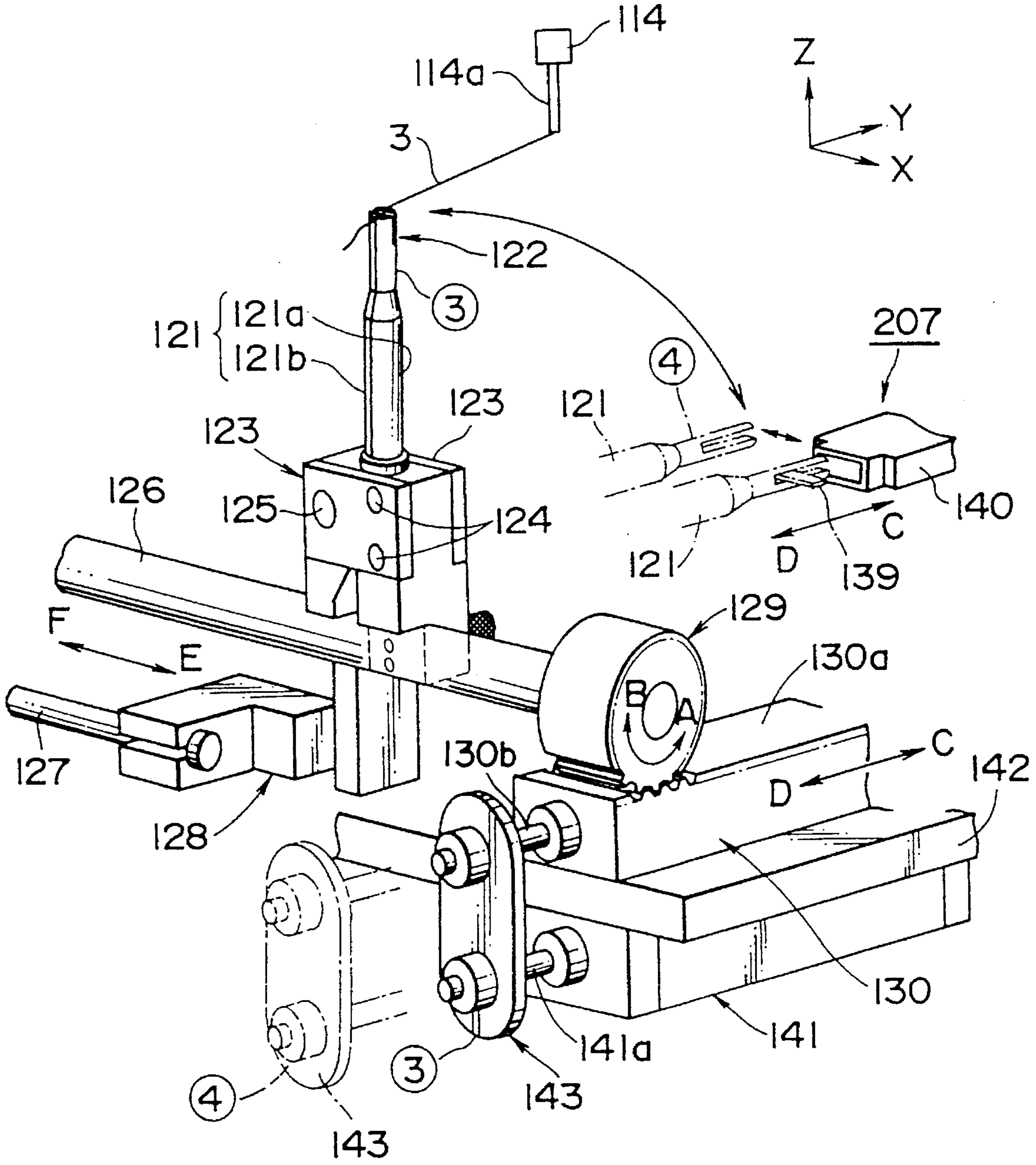
FIG. 22 is a perspective view showing the construction of the essential part of the wire terminal processing section of FIG. 19.

Detailed construction of the wire chucking section 106 is further shown in FIG. 22. Thus, the construction of the wire chucking section 106 shown in FIG. 19 will be described with further reference to FIG. 22. In particular, reference numeral 121 denotes a chuck including a fixed pawl 121*a* and a movable pawl 121*b*. The fixed pawl 121*a* and the movable pawl 121*b* are held on a pair of side plates 123 juxtaposed on the left and right sides in a contacting relationship with each other. The fixed pawl 121*a* is mounted fixedly on the side plates 123 by way of a pair of shafts 124 and is secured to a pinion shaft 126 so that it can rotate integrally with the pinion shaft 126. Meanwhile, the movable pawl 121*b* is mounted for pivotal motion on the side plates 123 by way of a pivot shaft 125 so that, by pivotal motion thereof, a free end of the fixed pawl 121*a* and a free end of the movable pawl 121*b* can be spaced away from each other to provide a gap X therebetween (refer to FIG. 24) or can be closely contacted with each other (refer to FIGS. 23 and 25). Further, though not shown, a spring is interposed between the fixed pawl 121*a* and the movable pawl 121*b* and biases the movable pawl 121*b* so that the end of the fixed pawl 121*a* and the end of the movable pawl 121*b* are normally held in close contact with each other by the resilient force of the spring.

Reference numeral 127 denotes a push rod, which is mounted for sliding movement in the direction of the X-axis in FIG. 19 under the control of an air cylinder not shown. A pusher 128 is mounted at an end of the push rod 127 in a corresponding relationship to a lower end of the movable pawl 121*b* so that a sliding operation of the push rod 127 can be transmitted to the movable pawl 121*b* by way of the pusher 128.

The pinion shaft 126 is held for rotation on the apparatus body. When the pinion shaft 126 is rotated, the fixed pawl 121*a* and the movable pawl 121*b* are rotated integrally with the pinion shaft 126. Further, a pinion gear 129 is mounted for integral rotation at an end of the pinion shaft 126.

Reference numeral 130 denotes a rack on which teeth 130*a* for meshing engagement with the pinion gear 129 are provided, and 141 denotes an actuator disposed below the rack 130 by way of a plate 142 which is mounted for movement in the directions of arrow marks C–D (Y-axis direction) in FIG. 22 on the apparatus body. The pinion shaft 126 and the push rod 127 are mounted on the plate 142 on which the rack 130 is mounted so that they can move integrally with the plate 142. Further, a rod 141*a* is provided on the actuator 141 such that it is slidably moved in the Y-axis direction in FIG. 22 to project from and retreat into the actuator 141. Reference numeral 143 denotes a rack-actuator connection plate, which interconnects a rod 130*b* extending from the rack 130 and a rod 141*a* of the actuator 141 to transmit movement of the rod 141*a* to the rack 130. Thus, when the rod 141*a* is advanced or retracted in the Y-axis direction, the rack 130 can be integrally moved in the Y-axis direction in an interlocking relationship with the rod 141*a*.

With the wire chucking section 106 described above, when the rod 141*a* of the actuator 141 is moved in the direction of the arrow mark C (Y-axis direction) in FIG. 22, also the rack 130 is simultaneously moved in the direction of the arrow mark C and the pinion gear 129 is rotated in the direction indicated by the arrow mark A in FIG. 19 integrally with the pinion shaft 126. Further, by the rotation of the pinion shaft 126, also the fixed pawl 121*a* and the movable pawl 121*b* are turned upwardly together with the pinion shaft 126. When the rod 126*a* is moved to the position indicated by reference character ③ in FIG. 22, also the fixed pawl 121*a* and the movable pawl 121*b* are rotated by about 90 degrees to their uprightly erected positions indicated by reference character ③ in FIG. 22 in which they extend vertically upwardly.

On the other hand, when the rod 141*a* is moved in the direction of the arrow mark D (Y-axis direction) in FIG. 22, also the rack 130 is simultaneously moved in the direction of the arrow mark D and the pinion gear 129 is rotated in the direction of the arrow mark B in FIG. 19 integrally with the pinion shaft 126. Further, by the rotation of the pinion shaft 126, also the fixed pawl 121*a* and the movable pawl 121*b* are turned downwardly integrally with the pinion shaft 126. When the rod 141*a* is moved to the position indicated by reference character ④ in FIG. 22, the chuck 121 constituted from the fixed pawl 121*a* and the movable pawl 121*b* is turned by about 90 degrees to its fallen position indicated by reference character ④ in FIG. 22 in which it lies substantially horizontally.

It is to be noted that, when the chuck 121 is moved parallelly from the fallen position to a further position, a suction nozzle of a dust collection section 140 is disposed at a position corresponding to an end portion of the chuck 121 so that a waste wire 3*a* which has been held by the chuck 121 till then is compulsorily sucked into the suction nozzle and scraped out from the chuck 121 as hereinafter described.

Further, in the present form, the operation initial positions of the fixed pawl 121*a* and the movable pawl 121*b* are defined as the upright positions of them, and the operation initial position of the plate 142 is defined as a position at which the fixed pawl 121*a* and the movable pawl 121*b* are positioned at the positions (chucking positions) indicated by reference character ① as shown in FIG. 19.

Figure 23:
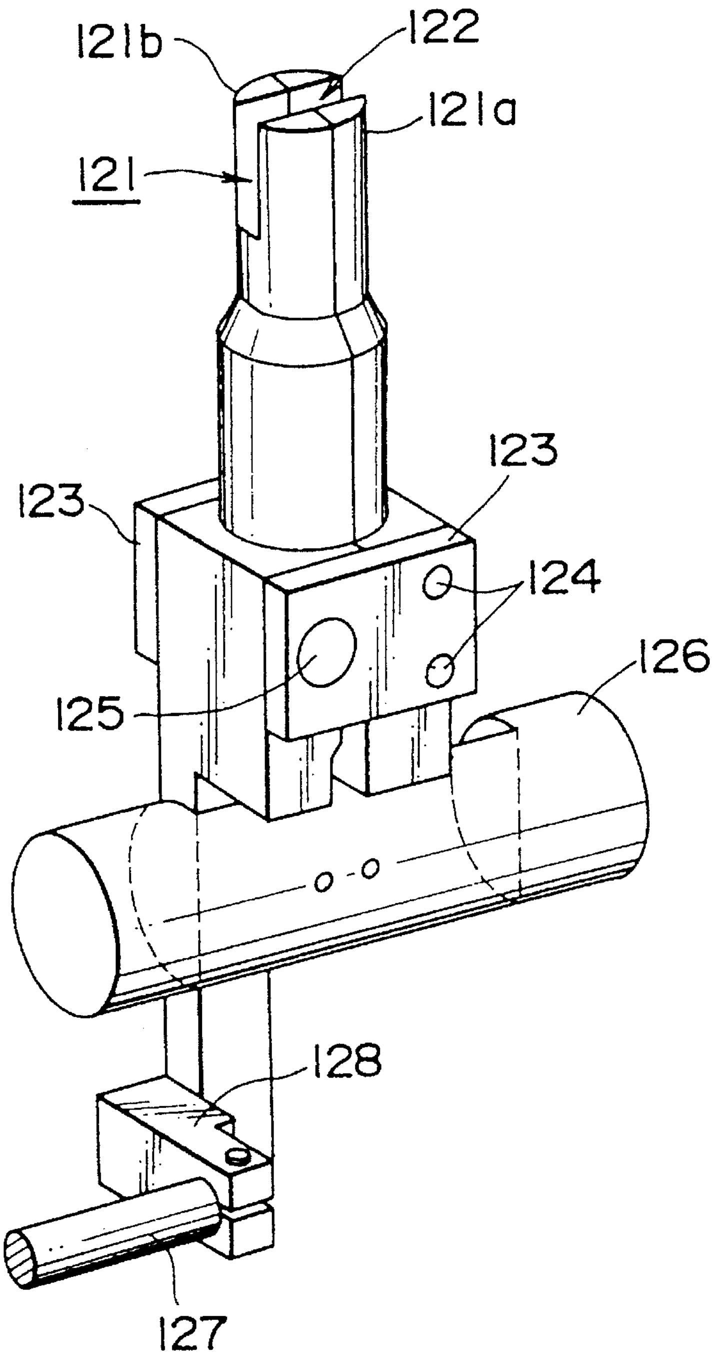
FIG. 23 is an enlarged perspective view showing the construction of a chucking section of the wire terminal processing section of FIG. 19.
Figure 24:
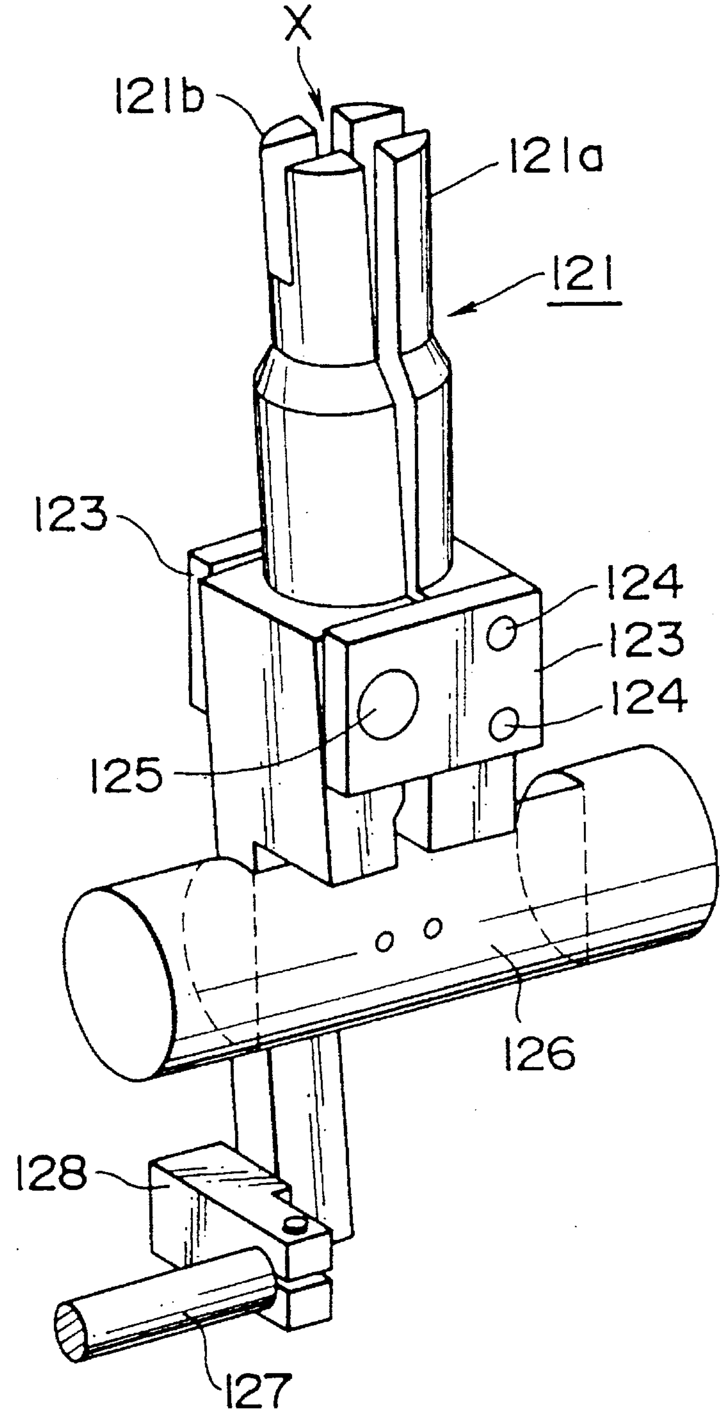
FIGS. 24 and 25 are similar views to FIG. 23 but illustrating different stages of operation of the chucking section.
Figure 25:
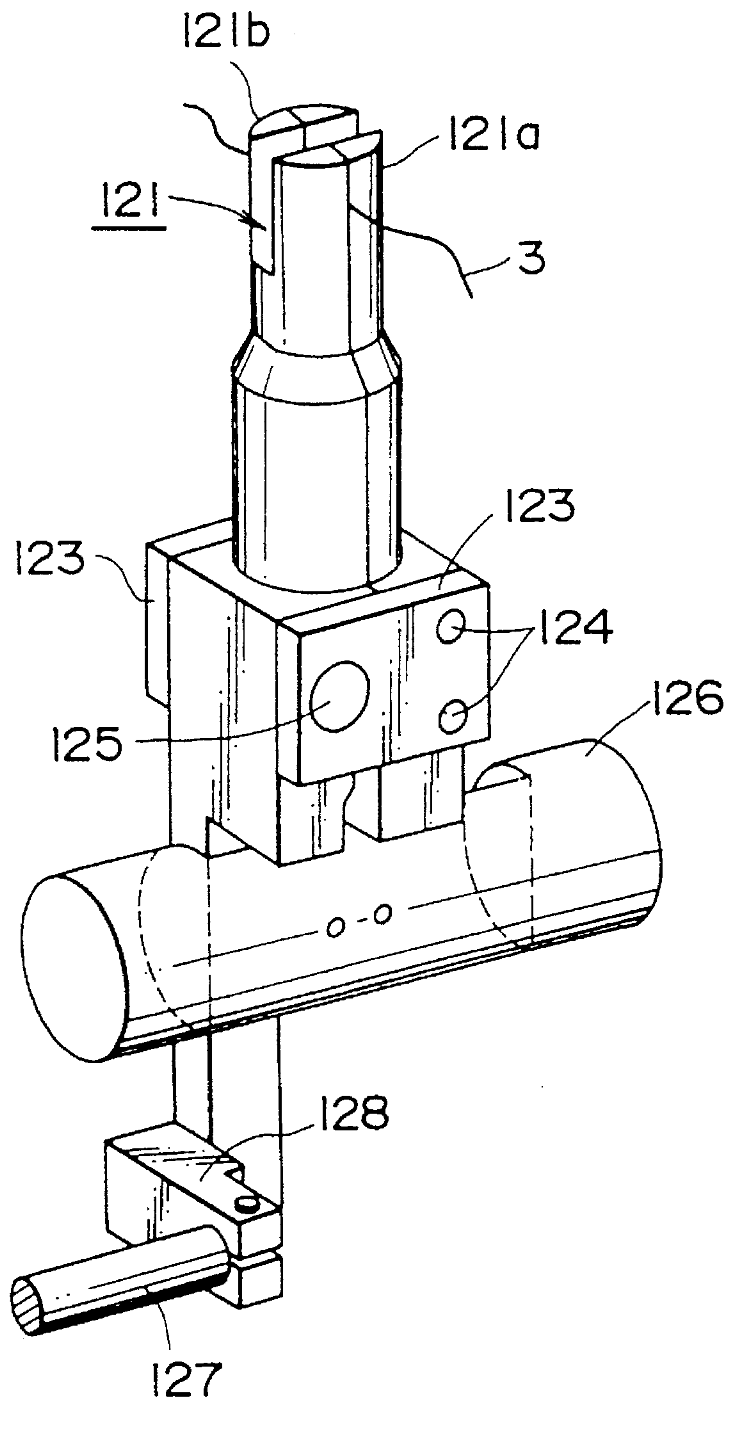

On the other hand, when the actuator not shown is driven so that the push rod 127 is slidably moved in the direction indicated by an arrow mark E in FIG. 22 and the end of the movable pawl 121*b* is pushed by the push rod 127 by way of the pusher 128, the movable pawl 121*b* is turned around the pivot shaft 125 by the pushing force in a direction in which the end of the fixed pawl 121*a* and the end of the movable pawl 121*b* are spaced away from each other until a gap X is formed between the end of the fixed pawl 121*a* and the end of the movable pawl 121*b* as seen in FIG. 24. On the other hand, when the push rod 127 is slidably moved in the direction indicated by an arrow mark F in FIG. 22 so that the pusher 128 is spaced away from the end of the movable pawl 121*b*, as such movement proceeds, also the movable pawl 121*b* is turned in the reverse direction around the pivot shaft 125 by the biasing force of the spring described above so as to restore the initial condition wherein the end of the fixed pawl 121*a* and the end of the movable pawl 121*b* are closely contacted with each other as shown in FIGS. 23 and 25.

The cutting mechanism 107 includes a bearing holder 131 mounted fixedly at an end of the plate 113 on which the nozzle member 114 is mounted, a cutter holder 133 mounted fixedly at an end of a pivot shaft 132 extending forwardly and rearwardly (in the Y-axis direction) through and disposed for rotation on the bearing holder 131, a cutter 134 fixedly mounted at a base end thereof on the cutter holder 133, a cam follower bracket 136 fixedly mounted at the other end of the pivot shaft 132 and having an elongated hole 135 therein, a slide lever 138 having a rotatable cam follower 137 held in engagement with the elongated hole 135 of the cam follower bracket 136 and disposed for sliding movement in the leftward and rightward directions (X-axis direction in FIG. 19).

The slide lever 138 can be moved in the directions indicated by arrow marks G–H in FIG. 19 by an air cylinder not shown. Such sliding movement of the slide lever 138 is transmitted to the cam follower bracket 136 through engagement between the cam follower 137 and the elongated hole elongated hole 135 to turn the cam follower bracket 136 back and forth in the directions indicated by an arrow mark 139 in FIG. 19. The turning motion of the cam follower bracket 136 turns the cutter holder 133 back and forth by about 90 degrees in the directions indicated by an arrow mark 144 in FIG. 19.

In particular, when the slide lever 138 is slidably moved in the direction of the arrow mark H, the cam follower bracket 136 is turned in the counterclockwise direction in FIG. 19 integrally with the pivot shaft 132 and the cutter holder 133 until it comes to a horizontal position (in the X-axis direction in FIG. 19) in which the cutter 134 extends horizontally. On the contrary when the slide lever 138 is slidably moved in the direction of the arrow mark G, the cam follower bracket 136 is turned by about 90 degrees in the clockwise direction in FIG. 19 integrally with the pivot shaft 132 and the cutter holder 133 until it comes to a vertical position in which the cutter 134 extends vertically downwardly (in the Z-axis direction in FIG. 19). Here, the cutting mechanism 107 has an initial position when the cutter 134 extends horizontally.

Subsequently, operation of the coil winding apparatus having the construction described above will be described.

First, the plate 113 and the chuck 121 are positioned at the respective positions indicated by reference character ① in FIG. 19, and the chuck 121 at the position holds or nips an end of a wire 3. Upon such holding operation, as described hereinabove, while the chuck 121 remains positioned at its upright position, the push rod 127 is slidably moved in the direction of the arrow mark E in FIG. 22 to push the end of the movable pawl 121*b* by way of the pusher 128 to produce a gap X between the fixed pawl 121*a* and the movable pawl 121*b* as seen in FIG. 24 so that the end of the wire 3 is received in the gap X. Subsequently, the push rod 127 is slidably moved in the direction of the arrow mark F in FIG. 22 so that the fixed pawl 121*a* and the movable pawl 121*b* are closely contacted with each other with the end of the wire 3 held therebetween as seen in FIG. 25.

After the wire 3 is held by the chuck 121, the wire 3 is partially entangled with an outer peripheral portion of an end of the chuck 121 by the nozzle 114*a*. After the entangling operation is completed, the plate 142 is moved in the direction of the arrow mark C in FIG. 22 by the suitable means not shown until it comes to and thereafter waits at a position at which the chuck 121 corresponds to an intermediate portion of the bobbin 2.

Subsequently, the nozzle member 114 is moved in the direction of the arrow mark C (Y-axis direction) in FIG. 19 together with the plate 113 until it comes to a wire darning position of the bobbin 2 indicated by reference character ② in FIG. 19. Further, the nozzle 114*a* is moved upwardly and downwardly in spirals to effect entangling or darning of the wire with the conductive terminal 111 of the bobbin 2, thereby completing preparations for coil winding.

Subsequently, the slide lever 138 of the cutting mechanism 107 is moved in the direction of the arrow mark G in FIG. 19 while the cutter holder 133 is turned. Then, when the cutter 134 is moved by about 90 degrees to its vertical position together with the cutter holder 133, the end of the cutter 134 is contacted with the wire 3 existing between the bobbin 2 and the chuck 121, and at the position, the wire 3 is cut. A portion of the thus cut wire 3 remaining on the chuck 121 side makes an end wire 3*a*. Thereafter, the plate 142 is moved in the direction of the arrow mark D in FIG. 22 again, whereupon the chuck 142 having the end wire 3*a* thereon is returned to the position indicated by reference character ① in FIG. 19, thereby entering a discarding preparation condition for the end wire 3*a*.

Then, the actuator 141 is rendered operative so that the rod 141*a* is moved in the direction of the arrow mark D (Y-axis direction) in FIG. 22. Simultaneously, also the rack 130 is moved in the direction of the arrow mark D and the pinion gear 129 is rotated in the direction of the arrow mark B in FIG. 22 integrally with the pinion shaft 126 so that the chuck 121 is rotated by about 90 degrees to its fallen down position indicated by reference character ④ in FIG. 22 and is further moved parallelly by the actuator not shown. Consequently, the suction nozzle of the dust collection section 140 of the cutting mechanism 207 is opposed to an end portion of the chuck 121. Here, a sucking operation of the dust collection section 140 is performed. Simultaneously, the push rod 127 is slidably moved in the direction of the arrow mark E in FIG. 22 to push the end of the movable pawl 121*b* by way of the pusher 128. Consequently, the movable pawl 121*b* and the fixed pawl 121*a* are spaced away from each other to remove the holding force to the end wire 3*a*, and consequently, the end wire 3*a* is sucked into the suction nozzle of the dust collection section 140 and discarded. It is to be noted that, in this instance, a scraping out member 139 is provided as the cutting mechanism 207 between the fixed pawl 121*a* and the movable pawl 121*b* so that the end wire 3*a* may be discarded compulsorily. The scraping out member 139 can be driven by an actuator not shown to move in a horizontal direction into a recessed portion 122 of the chuck 121.

Meanwhile, on the bobbin 2 side, the spindle 46 is rotated and the nozzle member 105 is moved in the directions of the arrow marks C–D together with the plate 112 so that the wire 3 is wound by a predetermined number of times, and after such winding of the wire 3, the wire 3 is entangled with the conductive terminal 111. After such entangling operation is completed, the wire 3 is cut between the nozzle 114*a* and the conductive terminal 111. Thereafter, the housing 43 is rotated by about 180 degrees around the rotary shaft 42 to its film winding position. At the film winding position, the film 4 is wound onto the wire 3. Thereafter, the housing 43 is rotated back so that the wire 3 is subsequently wound in a similar manner onto the film 4. After a substantially same sequence of operations are repeated a plurality of times in this manner, the bobbin 2 is removed from the spindle 46, thereby completing operation of one cycle. Then, the bobbin 2 is exchanged for a new bobbin 2.

Accordingly, with the wire terminal processing section 15 of the structure of the form described above, immediately after a wire 3 is entangled with the conductive terminal 111 of a bobbin 2, it can be cut between the conductive terminal 111 and the chuck 121 by means of the cutter 134, and consequently, a considerable reduction of the tact time can be achieved. Further, since winding and cutting processing can be performed while a wire 3 is held taut by the chuck 121, a winding operation is facilitated and the wire 3 can be wound regularly around a bobbin. Further, also cutting can be performed simply.

Figure 26:
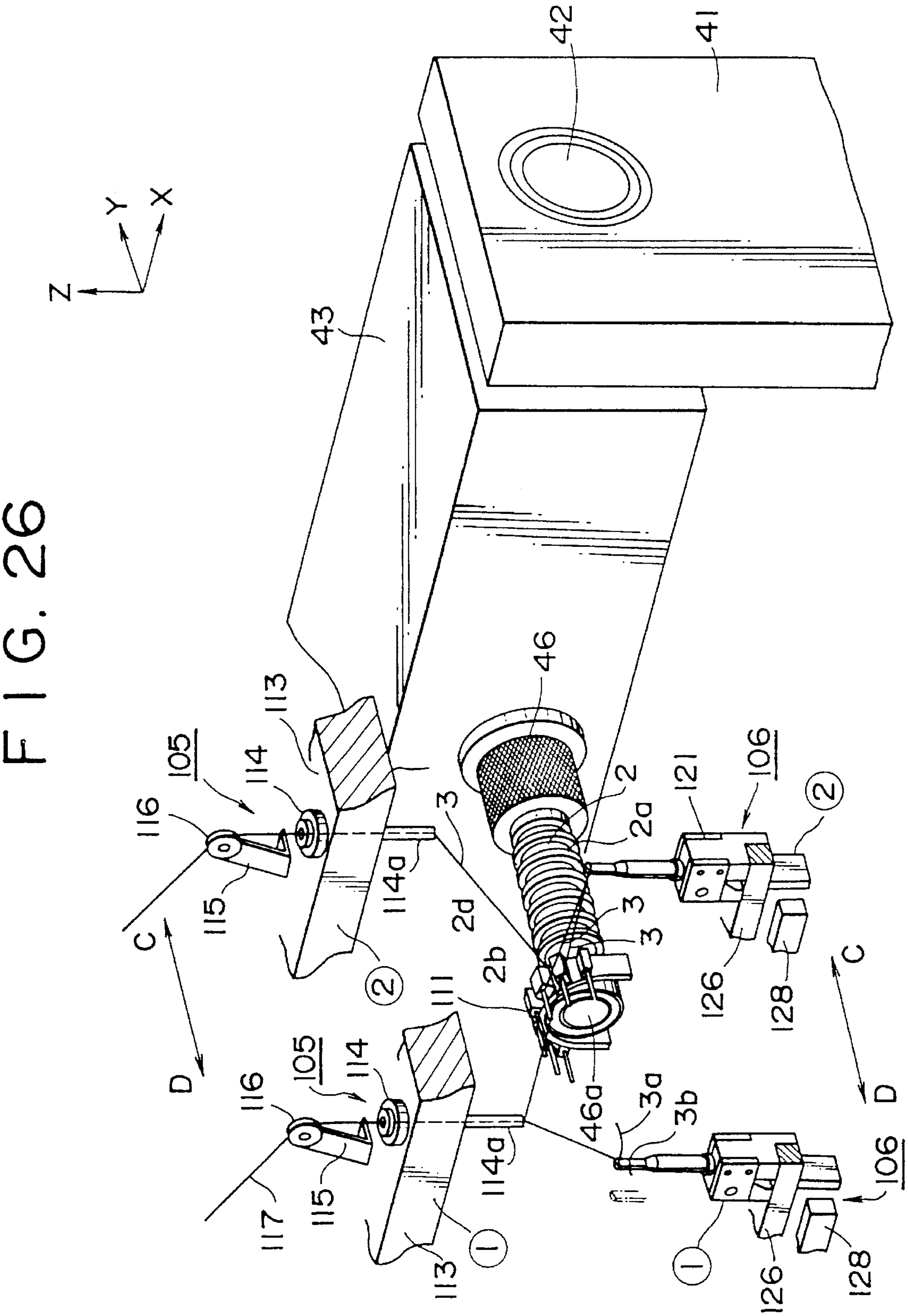
FIG. 26 is a perspective view showing the construction of another form of the wire terminal processing section according to the present invention.

FIG. 26 shows the construction of essential components of another form of the wire terminal processing section 15. While the basic construction of the present form is similar to those of FIGS. 19 and 22, in the present form, a wire is cut by movement of the wire chucking section 106 without using the cutting mechanism 107 of FIG. 19.

First, the nozzle 114*a* and the chuck 121 are positioned at the respective positions indicated by ① in FIG. 26, and at the position of the chuck 121, the chuck 121 holds or nips a wire 3 fed out from the nozzle 114*a*, and further, an operation of entangling the wire 3 with the chuck 121 is performed. Subsequently, while the chuck 121 holds the wire 3, it moves in the Y-axis direction from the position indicated by ① in FIG. 26, and then it waits at an intermediate position of a bobbin 2. Then, the nozzle 114*a* advances from the position indicated by ① in FIG. 26 in the Y-axis direction to its wire entangling position, from which it thereafter moves in spirals in the Y-axis direction to effect a wire entangling operation of the wire 3 with the conductive terminal 111 of the bobbin 2. At a point of time when entangling of the wire with the conductive terminal 111 is completed, the wire 3 is in a taut condition without any slack between the nozzle 114*a* and the conductive terminal 111 and between the conductive terminal 111 and the chuck 121.

Subsequently, the chuck 121 is moved in the Y-axis direction of FIG. 26, that is, in a direction spaced away from the conductive terminal 111 by the actuator (not shown). The wire 3 is torn by such movement of the chuck 121, and the portion of the wire 3 which has been taut between the conductive terminal 111 and the chuck 121 is held as an end wire 3*a* by the chuck 121. Subsequently, the chuck 121 holding the end wire 3*a* thereon is returned to the position indicated by ① in FIG. 26, entering a discarding preparation condition for the end wire 3*a*. An end of the chuck 121 normally remains in a posture directed in the Z-axis direction in FIG. 26 until after the discarding preparation condition is entered.

Meanwhile, the nozzle 114*a* advances in the Y-axis direction in a timed relationship with rotation of the spindles 46 and performs winding operation of the wire 3 extending between the nozzle 114*a* and the conductive terminal 111.

Figure 27:
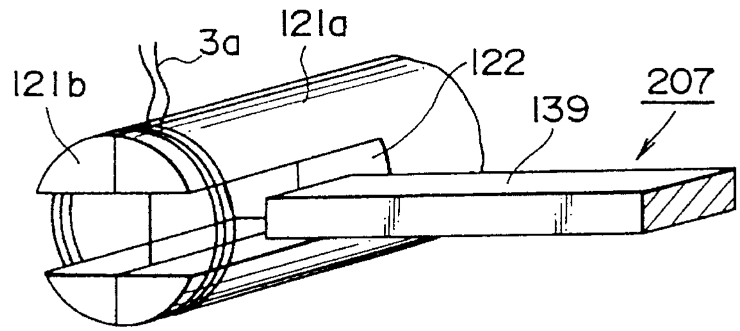
FIGS. 27 to 29 are perspective views illustrating different stages of operation of an end member removing member of the wire terminal processing section shown in FIG. 26.
Figure 28:
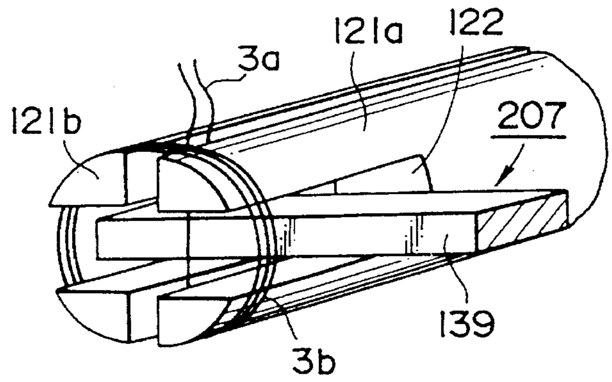

Subsequently, the actuator 141 is moved by a predetermined amount in the direction of the arrow mark D in FIG. 22. Thereupon, the pinion gear 129 is rotated in the direction of the arrow mark B in synchronism with the movement of the actuator 141, and the chuck 121 is pivoted in the direction indicated by reference character ④ in FIG. 22 by way of the pinion shaft 126. The chuck 121 is further moved parallelly by operation of the actuator not shown to the end wire discarding position. Then, when the end wire discarding position is reached, an end wire removal section 207 is opposed to an end portion of the chuck 121, and the scraping out member 139 coincides with the recessed portion 122 of the chuck 121 as seen in FIG. 27.

Figure 29:
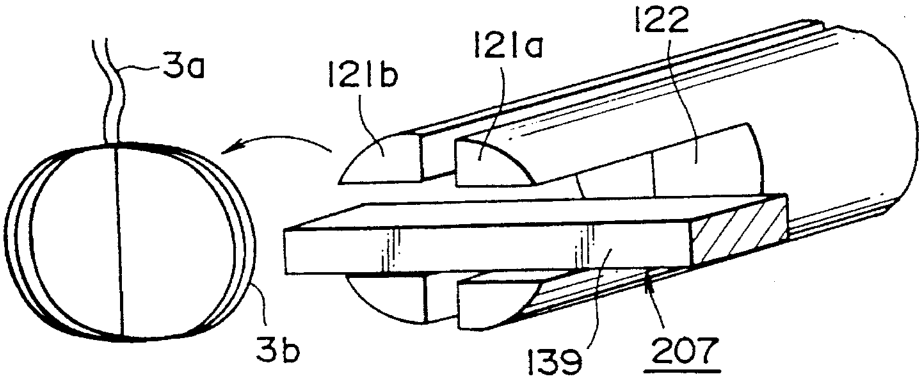

Thereafter, the scraping out member 139 is moved in a horizontal direction toward the chuck 121 so that an end of the scraping out member 139 enters the recessed portion 122 on the rear side of the position where the end wire 3*a* is entangled as seen in FIG. 29.

Simultaneously, a sucking operation of the dust collection member 140 is performed, and the push rod 127 is slidably moved in the direction of the arrow mark E in FIG. 22 to push the lower end of the movable pawl 121*b* by way of the pusher 128. Consequently, the movable pawl 121*b* and the fixed pawl 121*a* are spaced away from each other to remove the holding force to the end wire 3*a*. Then, the actuator not shown is rendered operative so that the chuck 121 is moved in the direction of the arrow mark D in FIG. 22 away from the scraping out member 139 together with the plate 142. Consequently, the end wire 3*a* entangled with an end portion of the fixed pawl 121*a* is compulsorily discarded by the scraping out member 139 as seen in FIG. 29. Then, the end wire 3*a* thus discarded is further sucked by the suction nozzle of the dust collection member 140 and scraped out. It is to be noted that only one of the dust collection member 140 and the scraping out member 139 may be employed.

Simultaneously, the chuck 121 is returned to the position indicated by reference character ③ in FIG. 22 and then to the position indicated by reference character ① in FIG. 26.

Accordingly, with the wire terminal processing section 15 having the construction of the present form, the wire 3 supplied from the nozzle 114*a* is held or nipped by the chuck 121 and waits until the nozzle 114*a* entangles the wire 3 with the conductive terminal 111. Then at the point of time when entangling of the wire 3 with the conductive terminal 111 is completed, the wire 3 extending between the conductive terminal 111 and the chuck 121 is pulled to be torn by the chuck 121. The wire 3 thus torn and remaining on the chuck 121 side is compulsorily discharged and discarded as the end wire 3*a* from the chuck 121 by an operation of the end wire removal section 207. Thus, the end wire 3*a* can be processed simply with certainty.

[Operation of the Entire Coil Winding Apparatus]

Subsequently, the series of operations after empty bobbins 2 are supplied until the bobbins 2 completed, each by winding a wire 3 and a film 4 a predetermined number of times using the coil winding apparatus 1 constructed in such a manner as described above are discharged will be described.

First, the bobbins 2 are mounted onto the bobbin holding shafts 18 of the pallets 11 at the bobbin supply station not shown and are transported in units of three pallets 11 to the carrying in/discharging section 12 by the transport drive means not shown until the three pallets 11 are stopped at the positions defined by the stoppers 17.

Consequently, the chucking sections 27 on the lower side of the rotatable plate 24 of the carrying in/discharging section 12 correspond to the bobbins 2 on the pallets 11, and the chucking sections 27 on the upper side of the rotatable plate 24 correspond to the bobbins 2 on the spindles 46 disposed on the film winding side of the film and wire winding working section 14. It is to be noted that a wire 3 and a film 4 are wound by a predetermined number of times on each of the bobbins 2 mounted on the spindles 46, and a terminal end of the wire 3 has been processed by the wire terminal processing section 15.

Then, the plungers 30*a* and 30*b* of the automatic loader section 13 are operated in their opening directions, and while the arm members 34*a* and 34*b* of each of the chucks 28 are open, the cylinders 32 are rendered operative to project the slide plates 31. Consequently, the chucks 28 are moved integrally with the slide plates 31 toward the carrying in/discharging section 12 and the film and wire winding working section 14, and on the carrying in/discharging section 12 and the film and wire winding working section 14 side, the bobbin receivers 35 are contacted with ends of the bobbins 2 yielding the individual coil springs 38.

Then, the plungers 30*a* and 30*b* are operated in their closing directions so that the arm members 34*a* and 34*b* of each of the chucks 28 are closed. Then, the cylinders 32 are operated to draw the slide plates 31 toward the rotatable plate 24 side. Thereupon, the bobbins 2 are resiliently held between the bobbin receivers 35 and the hooked portions 33*a* of the pawls 33. Consequently, the bobbins 2 on the pallets 11 side and the bobbins 2 on the film and wire winding working section 14 side are delivered to the automatic loader section 13 side.

It is to be noted that the bobbins 2 on the spindles 46 disposed on the wire winding side of the film and wire winding working section 14 side remain mounted as they are, and in the meantime, only the drive means 45A or 45B on one side is driven and winding of the wires 3 continues.

Subsequently, the index 26 of the automatic loader section 13 is driven so that the rotatable plate 24 is rotated by 180 degrees. Consequently, the chucking sections 27 on the lower side of the rotatable plate 24 correspond to the empty bobbin holding shafts 18 on the pallets 11 while the chucking sections 27 on the upper side of the rotatable plate 24 correspond to the empty spindles 46 positioned on the film winding side of the film and wire winding working section 14.

Thereafter, the cylinders 32 of the automatic loader section 13 are operated to project the slide plates 31. Consequently, the chucks 28 are moved integrally with the slide plates 31 toward the carrying in/discharging section 12 and the film and wire winding working section 14 side so that the bobbin receivers 35 resiliently deform the coil springs 38, and consequently, the bobbins 2 held on the chucks 28 are mounted onto the bobbin holding shafts 18 on the pallets 11 and the spindles 46 on the film and wire winding working section 14 side.

Then, the plungers 30*a* and 30*b* are operated in their opening directions so that the arm members 34*a* and 34*b* of the chucks 28 are opened. Consequently, the bobbins 2 are pressed against the spindles 46 or the bobbin holding shafts 18 side by the bobbin receivers 35 and thus positioned by them.

Subsequently, the cylinders 32 of the automatic loader section 13 are operated to draw the slide plates 31 toward the rotatable plate 24 side. Consequently, the bobbins 2 are delivered to the bobbin holding shafts 18 of the pallets 11 side and the spindles 46 of the film and wire winding working section 14 side.

Further, on the pallets 11 side onto which the bobbins 2 have been delivered, the bobbins 2 are fed from the carrying in/discharging section 12 to the discharging section not shown by the transport drive means and discharged by the discharging section. Thereafter, new empty bobbins 2 supplied from the bobbin supply section again are mounted onto the bobbin holding shafts 18 and then moved to the carrying in/discharging section 12, in which they thereafter wait.

Meanwhile, on the film and wire winding working section 14 side, also the drive means 45B or 45A on the film winding side are driven to start a film winding operation.

In the film and wire winding working section 14, before the drive means 45B and 45A start their rotation, the positioning pins 71 of the movable plate 70 are engaged in the positioning recesses 64 of the position control plates 63 to effect indexing of the positions, and accordingly, when the spindles 46 are rotated, the bobbins 2 normally start their rotation from the same positions.

When the motor 84 of the drive means 45A and 45B rotates, the rotation is transmitted to each of the power transmission belts 51 by way of the corresponding pulley 85, power transmission belt 89, pulley 88, power transmission belt 83, pulley 91, coupling mechanism 92 and friction wheel 49, and further, the spindles 46 are rotated integrally by way of the friction wheels 47 so that wires 3 or films 4 are wound by a predetermined number of times onto the bobbins 2 mounted on the bobbin mounting shafts 62 of the spindles 46. Further, since here the drive means 45A and 45B have independent drive systems, the side on which winding of the wires 3 or the films 4 is completed proceeds immediately to a next operation for exchanging for next bobbins 2 or waits a next winding operation of the wires 3 or the films 4. It is to be noted that, also upon stopping of the spindles 46, the positioning pins 71 of the movable plate 70 are engaged into the positioning recesses 64 of the position control plates 63 to stop the movable plates 70 thereby to effect indexing of the positions.

Then, when winding of the wires 3 or the films 4 of a predetermined layer or layers onto the bobbins 2 is not completed, after winding of the wires 3 and the films 4 for one layer is completed, the index 44 is driven so that the housing 43 is rotated by 180 degrees. Consequently, the spindles 46 which have been on the wire winding side are positioned to the film winding side while the spindles 46 which have been on the film winding side are positioned on the wire winding side.

Subsequently, the drive means. 45A and 45B are driven to rotate the spindles 46 so that the films 4 are wound onto the wires 3 and the wires 3 are wound onto the films 4, and after the wires 3 and the films 4 are wound by the predetermined number of times, the drive means 45A and 45B are stopped again.

On the other hand, when winding of the wires 3 and the films 4 of a predetermined layer or layers onto the bobbins 2 is not completed, the index 44 is driven further so that the housing 43 is rotated by 180 degrees again. Consequently, the spindles 46 which have been on the wire winding side till then are positioned on the film winding side while the spindles 46 which have been on the film winding side are positioned on the wire winding side. Then, in a similar manner as described above, the films 4 are wound onto the wires 3 and the wires 3 are wound onto the films 4, and after the wires 3 and the films 4 are wound by the predetermined number of times, the drive means 45A and 45B are stopped again. Such a sequence of operations is repeated, and after winding of the wires 3 and the films 4 of the predetermined number of layers onto the bobbins 2 is completed, an exchanging operation of the bobbins 2 by the automatic loader section 13 is performed in such a manner as described above.

Accordingly, in the structure of the present embodiment, since the drive means 45A and 45B are provided independently of each other for the individual trains of the spindles 46 provided separately on the front and rear sides, the direction and the speed of rotation of the spindles 46 can be set arbitrarily for each of the trains. Further, since a degree of freedom can be obtained in setting of conditions of the speed and the direction of rotation of the spindles in the spindle trains, when an operation on the spindles 46 in one of the trains is completed, even if an operation on the spindles 46 in the other train is not completed, a next winding operation can be started, and besides, an exchanging operation of the bobbins 2 including carrying in or carrying out can be performed. Consequently, the time within which the spindles 46 in one of the trains may otherwise be idle can be minimized, and the operation efficiency can be enhanced.

Further, since the bobbin mounting shafts 62 for mounting the bobbins 2 onto the spindles 46 can be exchanged readily by operation of the chucks 61, even if the shape or the like of the bobbins 2 is changed, the bobbin mounting shafts 62 can be exchanged for other shafts 62 conforming to the new bobbins 2.

Further, in the structure of the present embodiment, since the bobbins 2 can be set directly onto the spindles 46 or the bobbin holding shafts 18 using the chucking section 27 without using a jig for a bobbin or the like which is used also for transportation as is employed in the conventional apparatus, the force for moving the bobbins 2 can be reduced. Consequently, the automatic loader section 13 including the chucking sections 27 can be simplified in structure and reduced in size and can be provided at a reduced cost. Further, since there is no need of producing a large number of jigs as in the conventional apparatus, reduction in cost can be achieved.

Furthermore, the bobbins 2 can be set directly onto the spindles 46 or the bobbin holding shafts 18 without using a jig for a bobbin, and such a trouble that the accuracy is deteriorated by abrasion of a jig or a spindle upon setting of the jig as has been a problem of the conventional apparatus can be eliminated.

In addition, since the film and wire winding working section 14, the automatic loader section 13 and the carrying in/discharging section 12 are disposed substantially like stairs, an exchanging operation of a part, a maintenance operation or the like from the operator side can be performed readily.

It is to be noted that, while, in the embodiment described above, the spindles 46 are disposed in trains on the front and rear sides of the housing 43 and the chucks 28 are provided in trains on the front and rear sides of the rotatable plate 24 so that a plurality of bobbins 2 can be handled at a time and a plurality of pallets 11 are handled at a time, naturally another structure may be employed wherein only one spindle 46 is provided on each of the front and rear sides of the housing 43 and a number of chucks 28 corresponding to the housing 43 are provided on the front and rear sides of the rotatable plate 24.

As described so far, with the coil winding apparatus according to the present invention, since driving means are provided independently of each other for individual spindles and the direction and the speed of rotation of the individual spindles can be set arbitrarily, a clutch mechanism or the like, which has been required in the conventional apparatus, for cutting transmission of power between the spindles and drive means on the side on which winding has been completed first becomes unnecessary. Consequently, the structure is simplified, and the apparatus can be provided at a reduced cost.

Further, since a degree of freedom is obtained in setting the speed and the direction of rotation of the spindles in the individual spindle trains, when an operation in one side of the trains is completed, even if an operation in the other spindle train is not completed, a next winding operation can be started, and besides, an exchanging operation of bobbins including carrying in or carrying out can be performed. Consequently, the time within which the spindles in one of the spindle trains may possibly be idle can be eliminated or minimized, and the operation efficiency can be enhanced.

Further, with the coil winding apparatus according to the present invention, since bobbins can be set directly onto spindles and transported without using a jig for a bobbin which is also used to transport a bobbin, the force for moving a bobbin in a loading section can be reduced. Consequently, a chucking section can be produced with a simple structure and a small size and can be provided at a reduced cost. Further, since there is no need of producing a large number of jigs, reduction in cost can be achieved as well.

Furthermore, since bobbins can be set directly to the spindles without using a jig for a bobbin, there is no possibility that the accuracy may be deteriorated by abrasion of the jig or a spindle upon setting of the jig.

In addition, since the film and wire working section, the automatic loader section and the carrying in/discharging section are disposed substantially like stairs, an exchanging operation of a part, a maintenance operation or the like from the operator side can be performed readily, and the operability is improved.

Having now fully described the invention, it will be apparent to one of ordinary skill in the art that many changes and modifications can be made thereto without departing from the spirit and scope of the invention as set forth herein.

What is claimed is:

1. A coil winding apparatus, comprising:

a frame member intermittently rotatable around a fixed axis between first and second positions;

at least one pair of spindles mounted for rotation on opposed faces of said frame member;

a pair of drive means including a bidirectional motor, said drive means corresponding to said spindles each for transmitting rotation of said motor to a corresponding one of said spindles to rotate said spindles independently of each other at an arbitrarily set variable speed;

insulation sheet supply means opposed to one of said spindles when said frame member is at either of the first and second positions for supplying an insulation sheet to a bobbin mounted on the spindle; and wire processing means for supplying a wire to another bobbin mounted on the other spindle when said frame member is at either of the first and second positions;

the insulation sheet being wound onto the bobbin mounted on the one spindle while the wire is simultaneously wound onto the bobbin mounted on the other spindle.

2. A coil winding apparatus according to claim 1, wherein each of said spindles is removably mounted on said frame member so that it can be exchanged to accommodate a different bobbin to be used therewith.

3. A coil winding apparatus according to claim 1, wherein a plurality of spindles are provided on each of said different faces of said frame member in a mutually spaced relationship in a line parallel to the axis of said frame member, and further comprising means interposed between said frame member and said spindles for standardizing the winding starting and ending positions of the insulation sheet or the wire onto the bobbin.

4. A coil winding apparatus according to claim 3, wherein each of said spindles is removably mounted on said frame member so that it can be exchanged to accommodate a different bobbin to be used therewith.

5. A coil winding apparatus according to claim 1, wherein said wire processing means include a nozzle for supplying the wire, said nozzle being moved back and forth to entangle the wire with a terminal of the bobbin, said nozzle being further moved back and forth along an axis of the bobbin, a chuck for holding an end portion of the wire led out from said nozzle and holding the end portion of the wire in a taut condition for a time after the entangling operation of the wire with the terminal of the bobbin by said nozzle is completed until the end of the wire is cut, and cutting means including a cutter located in the proximity of said nozzle for cutting a portion of the wire present between the terminal of the bobbin and said chuck after completion of the entangling operation of the wire with the terminal of the bobbin by said nozzle.

6. A coil winding apparatus according to claim 5, wherein said cutting means is moved integrally with said nozzle in a direction along the axis of the nozzle to a wire winding end to cut also the wire on the winding end side of the bobbin.

7. A coil winding apparatus according to claim 1, wherein said wire processing means include a nozzle for supplying the wire, said nozzle being moved back and forth to entangle the wire with a terminal of the bobbin, said nozzle being further moved back and forth along an axis of the bobbin, a chuck for holding an end portion of the wire led out from said nozzle and holding the end portion of the wire in a taut condition for a time after the entangling operation of the wire with the terminal of the bobbin by said nozzle is completed until the end of the wire is cut, cutting means including a cutter located in the proximity of said nozzle for cutting a portion of the wire present between the terminal of the bobbin and said chuck after completion of the entangling operation of the wire with the terminal of the bobbin by said nozzle, and means for compulsorily removing the end portion of the wire remaining on said chuck after the yarn is cut by said cutting means.

8. A coil winding apparatus according to claim 1, wherein said wire processing means include a nozzle for supplying the wire, said nozzle being moved back and forth to entangle the wire with a terminal of the bobbin, said nozzle being further moved back and forth along an axis of the bobbin, a chucking section including a chuck including at least one pair of pawls disposed for opening and closing movements for holding an end portion of the wire led out from said nozzle, said chucking section holding the wire in a taut condition by means of said chuck for a time after the entangling operation of the wire with the terminal of the bobbin by said nozzle is completed, said chucking section tearing the end portion of the wire after completion of the entangling operation, and end wire removing means for compulsorily discharging the torn out portion of the wire inserted in said pawls of said chuck and remaining on said chuck.

9. A coil winding apparatus according to claim 8, wherein the portion of the wire is entangled with a portion of a circumferential face of an end portion of said chuck before the wire is torn by said chuck.

10. A coil winding apparatus according to claim 8 or 9, wherein each of said pair of pawls has a recessed portion formed thereon substantially perpendicularly to contacting faces of said pawls for holding the end portion of the wire therebetween such that said end wire removing means may be partially inserted into the recessed portions.

11. A coil winding apparatus according to claim 1, wherein a chuck is provided for pivotal motion substantially over 90 degrees so as to move between a position at which said chuck is directed in a vertical direction so that said chuck holds the end portion of the wire and another position at which said chuck is directed in a horizontal direction so that said chuck allows the end portion of the wire after the wire is broken or severed to be discharged therefrom.

12. A coil winding apparatus according to claim 1, wherein a chuck is provided for pivotal motion substantially over 90 degrees so as to move between a position at which said chuck is directed in a vertical direction so that said chuck holds the end portion of the wire and another position at which said chuck is directed in a horizontal direction so that said chuck allows the end portion of the wire after the wire is severed to be discharged therefrom, and a wire removing means is moved, when said chuck is directed in the horizontal direction, in the horizontal direction so that it is partially inserted into said recessed portions of said pawls.

13. A coil winding apparatus, comprising:

insulation sheet supply means for supplying an insulation sheet;

wire supply means for supplying a wire;

a film and wire winding working section for winding the insulation sheet supplied from said insulation sheet supply means and the wire supplied from said wire supply means alternately onto a bobbin;

a spindle provided in said film and wire winding working section for removably mounting a bobbin thereon;

a carrying in/discharging section including a bobbin holding shaft, onto which the bobbin can be removably mounted, for supplying and discharging the bobbin to and from said bobbin holding shaft; and an automatic loader section, disposed between said carrying in/discharging section and said film and wire winding working section, which turns between a first position and a second position and including a pair of chucking sections individually opposed to said bobbin holding shaft positioned on said carrying in/discharging section and said spindle of said film and wire winding working section when said automatic loader section is positioned at any of the first and second positions, and control means for controlling said chucking sections to move toward and away from said spindle and said bobbin holding shaft when said automatic loader section is positioned at any of the first and second positions so as to chuck and remove bobbins on and from said spindle and said bobbin holding shaft and mount the thus removed bobbins onto said bobbin holding shaft and said spindle.

14. A coil winding apparatus according to claim 13, wherein said chucking sections of said automatic loader section are provided on only one of upper and lower faces of said automatic loader section so as to alternately oppose said bobbin holding shaft positioned on said carrying in/discharging section and said spindle of said film and wire winding working section by the pivotal motion of said automatic loader section.

15. A coil winding apparatus according to claim 13 or 14, wherein each of said chucking sections includes a plurality of chucks disposed in a mutually spaced relationship in a line, and the operations of said chucks are controlled commonly by said control means.

16. A coil winding apparatus, comprising:

insulation sheet supply means for supplying an insulation sheet;

wire supply means for supplying a wire;

a film and wire winding working section for winding the insulation sheet supplied from said insulation sheet supply means and the wire supplied from said wire supply means alternately onto a bobbin;

a spindle provided in said film and wire winding working section for removably mounting a bobbin thereon;

a carrying in/discharging section including a bobbin holding shaft, onto which the bobbin can be removably mounted, for supplying and discharging the bobbin to and from said bobbin holding shaft; and an automatic loader section, disposed between said carrying in/discharging section and said film and wire winding working section, which turns between a first position and a second position and including first and second chucking sections provided symmetrically on upper and lower faces, respectively, of said automatic loader section so as to be opposed to said bobbin holding shaft positioned on said carrying in/discharging section and said spindle of said film and wire winding working section when said automatic loader section is positioned at any of the first and second positions;

said spindle of said film and wire winding working section being opposed to said first chucking section while said bobbin holding shaft is opposed to said second chucking section, said film and wire winding working section, said automatic loader section and said carrying in/discharging section being disposed substantially like stairs.

* * * * *